United States Patent
Hattori et al.

(10) Patent No.: US 10,717,855 B2
(45) Date of Patent: Jul. 21, 2020

(54) PRODUCTION METHOD OF ETHYLENE-BASED IONOMER AND ETHYLENE-BASED IONOMER

(71) Applicants: JAPAN POLYETHYLENE CORPORATION, Tokyo (JP); JAPAN POLYPROPYLENE CORPORATION, Tokyo (JP)

(72) Inventors: Takaaki Hattori, Kanagawa (JP); Toshiaki Egashira, Kanagawa (JP); Masahiro Uematsu, Kanagawa (JP)

(73) Assignees: JAPAN POLYETHYLENE CORPORATION, Tokyo (JP); JAPAN POLYPROPYLENE CORPORATION, Tokyo (JP)

( * ) Notice: Subject to any disclaimer, the term of this patent is extended or adjusted under 35 U.S.C. 154(b) by 15 days.

(21) Appl. No.: 15/518,314

(22) PCT Filed: Oct. 15, 2015

(86) PCT No.: PCT/JP2015/079234
§ 371 (c)(1),
(2) Date: Apr. 11, 2017

(87) PCT Pub. No.: WO2016/060218
PCT Pub. Date: Apr. 21, 2016

(65) Prior Publication Data
US 2017/0306134 A1    Oct. 26, 2017

(30) Foreign Application Priority Data

Oct. 15, 2014 (JP) ................. 2014-210668

(51) Int. Cl.
| | | |
|---|---|---|
| C08L 23/08 | (2006.01) | |
| C08F 8/44 | (2006.01) | |
| C08F 210/02 | (2006.01) | |
| C08F 8/12 | (2006.01) | |
| C08K 5/09 | (2006.01) | |
| C08L 23/06 | (2006.01) | |

(52) U.S. Cl.
CPC ............ *C08L 23/0876* (2013.01); *C08F 8/12* (2013.01); *C08F 8/44* (2013.01); *C08F 210/02* (2013.01); *C08K 5/09* (2013.01); *C08L 23/06* (2013.01); *C08F 2800/10* (2013.01); *C08F 2810/50* (2013.01)

(58) Field of Classification Search
None
See application file for complete search history.

(56) References Cited

U.S. PATENT DOCUMENTS

| | | |
|---|---|---|
| 3,264,272 A | 8/1966 | Rees |
| 4,801,649 A | 1/1989 | Statz |
| 4,956,418 A | 9/1990 | Tanaka et al. |
| 5,532,066 A * | 7/1996 | Latiolais ............. C08F 8/44 428/483 |
| 5,866,663 A | 2/1999 | Brookhart et al. |
| 6,596,815 B1 | 7/2003 | Feinberg |
| 2017/0002120 A1 | 1/2017 | Sato et al. |

FOREIGN PATENT DOCUMENTS

| | | |
|---|---|---|
| EP | 0805826 A2 | 11/1997 |
| JP | S59-133217 A | 7/1984 |
| JP | S63-270709 A | 11/1988 |
| JP | H02-129246 | 5/1990 |
| JP | H10-513489 A | 12/1998 |
| JP | 2005-516097 A | 6/2005 |
| JP | 2014-162755 | 9/2014 |
| WO | 96/23010 A2 | 8/1996 |
| WO | 2015/115378 A | 8/2015 |

OTHER PUBLICATIONS https://en.wikipedia.org/wiki/Saponification; Mar. 2019.*
Kryuchkov et al., J. Amer. Chem. Soc. 132 (2010) 15573-15579.*
Shupov et al., Macromolecules 41 (2008) 2309-2310.*
European Search Report issued with respect to Application No. 15849977.2, dated Feb. 14, 2018.
Kryuchkov et al., "Amphiphilic Polyethylenes Leading to Surfactant-Free Thermoresponsive Nanoparticles", J. Am. Chem. Soc., 2010, 132, pp. 15573-15579.
Notification of Reasons for Refusal issued by the Japanese Patent Office in Japanese Application No. 2015-203973 dated Jan. 25, 2019.
Chinese Office Action issued with respect to Application No. 201580056068.4, dated Sep. 27, 2018, and English translation thereof.
Office Action dated May 13, 2019 in corresponding Chinese Patent Application No. 201580056068.4 (with English translation).
European Office Action in the corresponding European Application No. 15849977.2 dated Feb. 28, 2019.
Office Action issued in the corresponding Chinese Patent Application No. 201580056068.4, dated Nov. 5, 2019 (with English translation).

(Continued)

*Primary Examiner* — Hui H Chin

(74) *Attorney, Agent, or Firm* — Greenblum & Bernstein, P.L.C.

(57) ABSTRACT

An object of the present invention is to provide a novel production method of ethylene-based ionomer having excellent mechanical properties and heat resistance which exhibits remarkably excellent breaking elongation, breaking stress, and strain hardening, and has a high melting point. The present invention relates to a production method of an ethylene-based ionomer including a heating conversion step of heating a specific ethylene/unsaturated carboxylic acid ester copolymer and converting the ester group in the copolymer into a metal-containing carboxylate containing a metal ion of Group 1, 2, or 12 of the periodic table.

12 Claims, 1 Drawing Sheet

(56) References Cited

OTHER PUBLICATIONS

Office Action in corresponding Japanese Application No. 2015-203973, dated Aug. 26, 2019 (with English translation).
Notice of Reasons for Refusal, Japan Patent Office, Application No. 2015-203973, draft on Mar. 26, 2020, with English translation thereof.

* cited by examiner

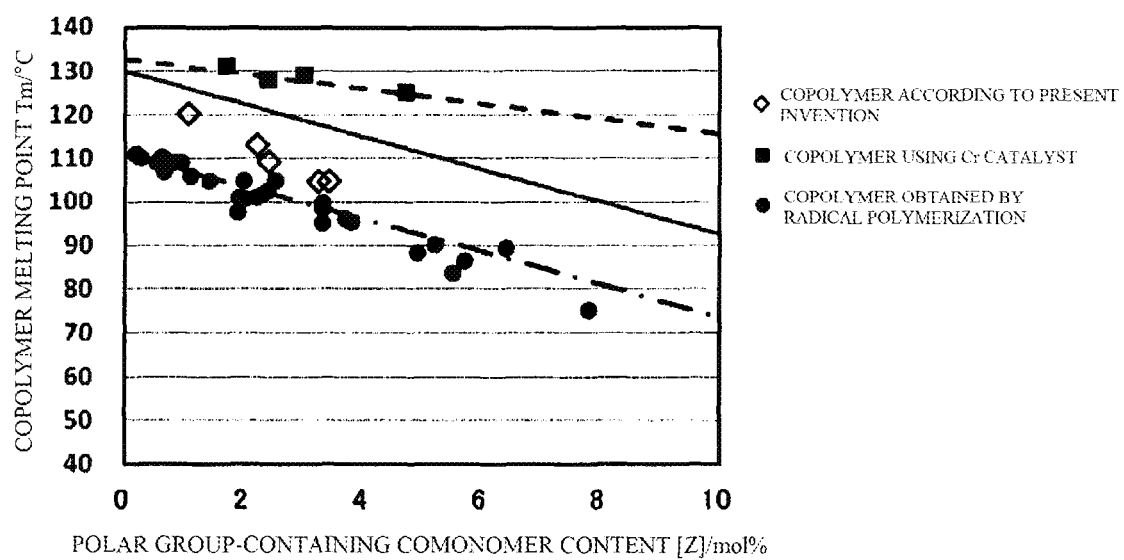

PRODUCTION METHOD OF ETHYLENE-BASED IONOMER AND ETHYLENE-BASED IONOMER

TECHNICAL FIELD

The present invention relates to a novel production method of ethylene-based ionomer and an ethylene-based ionomer.

BACKGROUND ART

The ethylene-based ionomer is a resin obtained by intermolecular bonding between molecules of a copolymer of ethylene and an unsaturated carboxylic acid such as (meth)acrylic acid with a metal ion such as sodium or zinc and has long been known as a resin having excellent heat sealability, transparency, toughness, abrasion resistance, and low temperature resistance (PTL 1), and for example, it is used as a material for golf balls.

At present, as commercially available ethylene-based ionomers, "SURLYN (registered trademark)" developed by DuPont, and "HIMILAN (registered trademark)" sold by DuPont-Mitsui Polychemical Co., Ltd. in Japan are known. As the ethylene/(meth)acrylic acid copolymer used in the ethylene-based ionomer known in the related art, specifically, a polar group-containing olefin copolymer obtained by polymerizing ethylene and a polar group-containing monomer such as (meth)acrylic acid by a high pressure radical polymerization method is used.

On the other hand, in a polymerization method using a catalyst such as a general metallocene catalyst, which is typically known as another production method of a polar group-containing olefin copolymer, it is known that if acrylic acid, methacrylic acid, or the like is used as the polar group-containing monomer, these polar group-containing monomers become catalyst poison, and thus, polymerization activity is extremely lowered, and due to this, a desired polar group-containing olefin copolymer cannot be obtained.

Therefore, as a modification of resins using an ethylene-based ionomer, a method of blending a high density polyethylene resin in an ethylene-based ionomer by a high pressure radical polymerization method in the related art (PTL 2), a method of copolymerizing other comonomer components (PTL 3), and the like have also been proposed.

In addition, examination in which using a chromium catalyst, a copolymer of ethylene and an acrylic acid ester is produced in the presence of a Lewis acid, then, the obtained polar group-containing olefin copolymer is hydrolyzed with sodium hydroxide to modify into an ethylene/acrylic acid copolymer, and by reacting with metal ions, an ethylene-based ionomer is produced has also been reported (PTL 4).

CITATION LIST

Patent Literature

[PTL 1] U.S. Pat. No. 3,264,272
[PTL 2] JP-T-2005-516097
[PTL 3] JP-A-59-133217
[PTL 4] JP-A-63-270709

SUMMARY OF INVENTION

Technical Problem

However, although the high pressure radical polymerization method is capable of polymerizing relatively inexpensively without depending on the type of the polar group-containing monomer, the molecular structure of the produced polar group-containing olefin copolymer is a structure irregularly having many long chain branches and short chain branches, and thus, the structure has a disadvantage of being insufficient in terms of strength.

In addition, in the methods described in PTLs 2 and 3, although the obtained resin is improved, it is not a fundamental solution.

In the production method described in PTL 4, at the stage of producing an ethylene/acrylic acid ester copolymer, a so-called masking method is used, and acrylic acid ester and equimolar or greater aluminum chloride are required, and thus, the production cost is inevitably increased. In addition, a large amount of aluminum compound is present in the polar group-containing olefin copolymer as an impurity and causes deterioration of mechanical properties, discoloration, and acceleration of deterioration, and to remove the compound, further increase in cost is required, and thus, it is inefficient and impractical. Furthermore, the copolymer of ethylene and an acrylic acid ester obtained by the above production method is described as a random copolymer, but from the relationship between the comonomer content and the melting point, it is thought that the copolymer is not a homogeneous random copolymer, and it is thought that the mechanical properties are not exhibited sufficiently high.

In view of the problems of the related art described above, an object of the present invention is to provide a novel production method of a ethylene-based ionomer having excellent mechanical properties and heat resistance which exhibits remarkably excellent breaking elongation, breaking stress, and strain hardening, and has a high melting point, and a novel ethylene-based ionomer, compared with the ethylene-based ionomer obtained by a high pressure radical polymerization method in the conventional art.

Solution to Problem

As a result of thorough studies in order to achieve the above object, the present inventors found a novel and efficient method capable of producing an excellent ethylene-based ionomer in which an ester group of an ethylene/unsaturated carboxylic acid ester copolymer obtained from ethylene and an unsaturated carboxylic acid ester using a late transition metal catalyst is converted into metal-containing carboxylate. Furthermore, the present inventors found that the ethylene-based ionomer has excellent mechanical properties and heat resistance, and exhibits remarkably excellent tensile properties (breaking elongation, breaking stress, and strain effect) and a balance between rigidity and toughness, and completed the present invention.

That is, the present invention relates to the following <1> to <14>.

<1> A production method of an ethylene-based ionomer, comprising:
a heating conversion step of heating an ethylene/unsaturated carboxylic acid ester copolymer and converting the ester group in the copolymer into a metal-containing carboxylate containing a metal ion of Group 1, 2, or 12 of the periodic table,
wherein the ethylene/unsaturated carboxylic acid ester copolymer is produced from at least one selected from the group consisting of ethylene and α-olefins having 3 to 20 carbon atoms and at least one or more unsaturated carboxylic acid esters, using a late transition metal catalyst.

<2> The production method of an ethylene-based ionomer according to the <1> above, wherein the heating conversion step comprises: converting the ethylene/unsaturated carboxylic acid ester copolymer into an ethylene/unsaturated carboxylic acid copolymer by hydrolysis or thermal decomposition; and reacting the ethylene/unsaturated carboxylic acid copolymer with a compound containing a metal ion of Group 1, 2, or 12 of the periodic table to convert the carboxylic acid in the ethylene/unsaturated carboxylic acid copolymer into the metal-containing carboxylate.

<3> The production method of an ethylene-based ionomer according to the <1> above, wherein the heating conversion step comprises reacting with a compound containing a metal ion of Group 1, 2, or 12 of the periodic table while hydrolyzing or thermally decomposing the ester group of the ethylene/unsaturated carboxylic acid ester copolymer, to convert the ester group portion in the ethylene/unsaturated carboxylic acid ester copolymer into the metal-containing carboxylate.

<4> The production method of an ethylene-based ionomer according to any one of the <1> to <3> above, wherein the unsaturated carboxylic acid ester is a (meth)acrylic acid ester.

<5> The production method of an ethylene-based ionomer according to any one of the <1> to <4> above, wherein the metal ion is at least one or more selected from the group consisting of $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$.

<6> The production method of an ethylene-based ionomer according to any one of the <1> to <5> above, wherein the heating temperature in the heating conversion step is 100° C. to 350° C.

<7> The production method of an ethylene-based ionomer according to any one of the <1> to <6> above, wherein the late transition metal catalyst is a catalyst represented by the following formula (1).

(Ligand)MRL    (1)

[In the formula (1), M represents a transition metal atom of Groups 8 to 11 in the periodic table, Ligand represents one or more atoms selected from the group consisting of an oxygen atom, a nitrogen atom, a phosphorus atom, an arsenic atom, a sulfur atom, and a carbon atom, and is a ligand which chelate-coordinates to M which is the central metal, R represents a ligand forming an σ bond with M, and L represents a ligand coordinated to M.]

<8> The production method of an ethylene-based ionomer according to any one of the <1> to <7> above, wherein the late transition metal catalyst is a phosphine-phenolate complex catalyst or a phosphine-sulfonate complex catalyst.

<9> The production method of an ethylene-based ionomer according to any one of the <2> to <8> above, wherein the ethylene/unsaturated carboxylic acid copolymer and the ethylene/unsaturated carboxylic acid ester copolymer are copolymers obtained by random copolymerizing an ethylene unit with an unsaturated carboxylic acid and an unsaturated carboxylic acid ester unit, in a substantially linear shape.

<10> The production method of an ethylene-based ionomer according to any one of the <2> to <9> above, wherein the ethylene/unsaturated carboxylic acid copolymer and the ethylene/unsaturated carboxylic acid ester copolymer have a phase angle δ of 45 degrees to 75 degrees at the absolute value $G^*=0.1$ MPa of a complex elastic modulus measured using a rotary rheometer.

<11> The production method of an ethylene-based ionomer according to any one of the <2> to <10> above, wherein the ethylene/unsaturated carboxylic acid copolymer and the ethylene/unsaturated carboxylic acid ester copolymer have a ratio Mw/Mn of the weight average molecular weight (Mw) to the number average molecular weight (Mn) of 1.5 to 4.0.

<12> An ethylene-based ionomer, comprising:

99.9 to 70.0 mol % in total of units derived from at least one selected from the group consisting of ethylene and α-olefins having 3 to 20 carbon atoms; and 0.1 to 30.0 mol % in total of units derived from at least one selected from the group consisting of an unsaturated carboxylic acid and an unsaturated carboxylic acid ester, wherein at least a part of polar groups in at least one of the ethylene/unsaturated carboxylic acid copolymer and the ethylene/unsaturated carboxylic acid ester copolymer having the following features (a) to (c) is converted into a metal-containing carboxylate containing a metal ion of Group 1, 2, or 12 of the periodic table:

(a) the weight average molecular weight/the number average molecular weight (Mw/Mn) measured by GPC is 1.5 to 4.0, (b) the phase angle δ at the absolute value $G^*=0.1$ MPa of a complex elastic modulus measured using a rotary rheometer is 45 degrees to 75 degrees, (c) the melting point (Tm, ° C.) observed by measurement using differential scanning calorimeter (DSC) and the total content [Z] (mol %) of the unsaturated carboxylic acid unit and the unsaturated carboxylic acid ester unit included in the ethylene/unsaturated carboxylic acid copolymer and the ethylene/unsaturated carboxylic acid ester copolymer, satisfy the following expression (I).

$$50 < Tm < -3.74 \times [Z] + 130 \quad (I)$$

<13> The ethylene-based ionomer according to the <12> above, wherein the total amount of aluminum (Al) included in the ethylene/unsaturated carboxylic acid copolymer and the ethylene/unsaturated carboxylic acid ester copolymer is 0 to 100,000 μg per 1 g of the ethylene/unsaturated carboxylic acid copolymer and the ethylene/unsaturated carboxylic acid ester copolymer.

<14> The ethylene-based ionomer according to the <12> or <13> above, wherein the unsaturated carboxylic acid or the unsaturated carboxylic acid ester is (meth)acrylic acid or (meth)acrylic acid ester.

Advantageous Effects of Invention

The production method of the ethylene-based ionomer of the present invention can efficiently produce an ethylene-based ionomer having excellent mechanical properties and heat resistance which exhibits remarkably excellent tensile properties (breaking elongation, breaking stress, and strain hardening), a balance between rigidity and toughness, and a melting point, without using an excessive amount of aluminum compound, compared with the ethylene-based ionomer using the polar group-containing olefin copolymer obtained by a high pressure radical polymerization method in the related art.

In addition, the ethylene-based ionomer of the present invention has remarkably excellent tensile properties such as breaking elongation, breaking stress, and strain hardening, and excellent mechanical properties such as a balance between rigidity and toughness, and has also excellent heat resistance.

BRIEF DESCRIPTION OF DRAWINGS

FIG. 1 is a graph showing the relationship between the polar group-containing comonomer content and the melting point in a copolymer according to the present invention and a copolymer obtained by a production method (a Cr catalyst and a radical polymerization method) in the related art.

DESCRIPTION OF EMBODIMENTS

The present invention relates to an ethylene-based ionomer in which a carboxylic acid portion of an ethylene/unsaturated carboxylic acid copolymer obtained by randomly copolymerizing an ethylene unit and at least one unsaturated carboxylic acid unit in a substantially linear shape has become a metal-containing carboxylate including the metal ions of Group 1, 2 or 12 of the periodic table and the production method.

Hereinafter, the present invention will be described in detail for each item.

In the present specification, "(meth)acrylic acid" refers to both acrylic acid and methacrylic acid. In addition, "to" which shows a numerical range is used to describe a range in which the numerical values described before and after "to" indicate the upper limit value and the lower limit value.

Furthermore, "polar group-containing olefin copolymer" means a collective term of ethylene/unsaturated carboxylic acid copolymer and ethylene/unsaturated carboxylic acid ester copolymer, and may be one copolymer or both copolymers. In addition, "polar group-containing monomer" means a collective term of unsaturated carboxylic acid and unsaturated carboxylic acid ester.

1. Ethylene-Based Ionomer

The ethylene-based ionomer according to the present invention has an ethylene/unsaturated carboxylic acid copolymer having a specific molecular structure described below as a base polymer, and at least a part of the carboxyl groups of the ethylene/unsaturated carboxylic acid copolymer has a structure neutralized by metal ions.

That is, at least a part of the carboxylic acid portion or the carboxylic acid ester portion of an ethylene/unsaturated carboxylic acid copolymer and/or an ethylene/unsaturated carboxylic acid ester copolymer (polar group-containing olefin copolymer) obtained by randomly copolymerizing an ethylene unit and an unsaturated carboxylic acid unit in a substantially linear shape is neutralized with metal ions of Group 1, 2, or 12 of the periodic table, and due to this, has a structure converted into the metal-containing carboxylate including metal ions.

(1) Metal Ion

The metal ions included as the metal of the metal-containing carboxylate in the ethylene-based ionomer are not particularly limited, and metal ions used in ethylene-based ionomers know in the related art can be included. Among these, metal ions of Group 1, 2, or 12 of the periodic table are preferable, and at least one or more selected from the group consisting of $Li^+$, $Na^+$, $K^+$, $Rb^+$, $Cs^+$, $Mg^{2+}$, $Ca^{2+}$, $Sr^{2+}$, $Ba^{2+}$, and $Zn^{2+}$ are more preferable. One or more types of these metal ions may be mixed in, and if necessary, two or more types may be mixed in.

The content of the metal ions preferably includes an amount at which at least part or all of the carboxyl groups of the ethylene/unsaturated carboxylic acid copolymer in the base polymer can be neutralized, and the preferable degree of neutralization (average degree of neutralization) is preferably 5% to 95%, more preferably 10% to 90%, and still more preferably 20% to 80%.

If the degree of neutralization is high, there is a tendency that the tensile strength and the tensile stress at break of the ethylene-based ionomer are high, and the tensile fracture strain decreases, but the melt flow rate (MFR) of the ionomer decreases, and if the degree of neutralization is low, there is a tendency that an ionomer having a moderate MFR is obtained, but the tensile modulus and the tensile stress at break of the ethylene-based ionomer are low, and the tensile fracture strain increases.

The degree of neutralization can be calculated from the comonomer content and the molar ratio of the metal ions added.

(2) Ethylene/Unsaturated Carboxylic Acid Copolymer

As the ethylene/unsaturated carboxylic acid copolymer included in the ethylene-based ionomer, it is important to use an ethylene/unsaturated carboxylic acid copolymer obtained by "randomly copolymerizing an ethylene unit and an unsaturated carboxylic acid unit in a substantially linear shape", unlike the polymers in the related art, having many branches obtained by polymerizing an ethylene unit and an unsaturated carboxylic acid unit by a high pressure radical polymerization method. The "ethylene unit" means a structural unit derived from at least one selected from the group consisting of ethylene and α-olefin having 3 to 20 carbon atoms.

Such an ethylene/unsaturated carboxylic acid copolymer having such characteristics can be produced by the novel production method newly found by the present applicants, in which using not a metallocene catalyst generally known in the related art but a specific catalyst developed by the present inventors in recent years, that is, a late transition metal catalyst (see Japanese Patent No. 2013-209349), first, ethylene and unsaturated carboxylic acid ester are produced, then the ethylene/unsaturated carboxylic acid ester copolymer is heat-treated, and as a result, an ethylene/unsaturated carboxylic acid copolymer is obtained. Hereinafter, the ethylene/unsaturated carboxylic acid ester copolymer will be described in detail.

(3) Ethylene/Unsaturated Carboxylic Acid Ester Copolymer (3-1) Constituent Monomer The ethylene/unsaturated carboxylic acid ester copolymer according to the present invention is obtained by polymerizing ethylene and/or α-olefin having 3 to 20 carbon atoms and one or more types of unsaturated carboxylic acid esters in the presence of a late transition metal catalyst described below.

The ethylene and/or the α-olefin having 3 to 20 carbon atoms subjected to polymerization are not particularly limited, and the ethylene and/or the α-olefin having 3 to 20 carbon atoms subjected to polymerization may be used alone, or two or more types may be used. Preferably, ethylene is essentially included, and if necessary, one or more α-olefins having 3 to 20 carbon atoms may by further included.

In addition, in a range not departing from the gist of the present invention, other monomers not containing a polar group may be further subjected to polymerization.

In an ethylene-based ionomer, the proportion of the structural unit (ethylene unit) derived from ethylene and/or α-olefin is desirably selected from a range of typically 99.99 to 60.0 mol %, preferably 99.9 to 70.0 mol %, more preferably 99.9 to 80.0 mol %, and still more preferably 99.5 to 90.0 mol %, in total.

In addition, the unsaturated carboxylic acid ester to be subjected to polymerization is not particularly limited, and may be used alone, or two or more types may be used. The proportion of the structural unit derived from an unsaturated carboxylic acid ester is desirably selected from a range of typically 0.01 to 40.0 mol %, preferably 0.1 to 30.0 mol %, more preferably 0.1 to 20.0 mol %, and still more preferably 0.5 to 10.0 mol %, in total.

If the ethylene unit is too much, the effects as an ionomer become difficult to be developed, and if the ethylene unit is too small, the production becomes difficult.

(i) α-Olefin

The α-olefin according to the present invention is an α-olefin having 3 to 20 carbon atoms, represented by the structural formula: $CH_2=CHR^{18}$ ($R^{18}$ is a hydrocarbon group having 1 to 18 carbon atoms, which may have a linear structure or a branched structure). More preferably, the α-olefin is an α-olefin having 3 to 12 carbon atoms, still more preferably, an α-olefin selected from propylene, 1-butene, 1-pentene, 1-hexene, 1-octene, 1-decene, 3-methyl-1-butene, and 4-methyl-1-pentene, and more suitably, an α-olefin selected from propylene, 1-butene, 1-hexene, and 1-octene. The α-olefin to be subjected to polymerization may be used singly or two or more types thereof may be used.

(ii) Monomer not Containing Polar Group

The monomer not containing a polar group which may be included in the present invention is a monomer having one or more carbon-carbon double bonds in the molecular structure and is not limited as long as the elements constituting the molecule are only carbon and hydrogen, and examples thereof include dienes, trienes, aromatic vinyl monomers, and cyclic olefins, and butadiene, isoprene, styrene, vinylcyclohexane, cyclohexene, vinylnorbornene, is norbornene preferable.

(iii) Unsaturated Carboxylic Acid Ester

As the unsaturated carboxylic acid ester according to the present invention, the compounds known in the related art can be used. Specifically, acrylic acid esters, methacrylic acid esters, maleic acid esters, fumaric acid esters, and itaconic acid esters are exemplified, and among these, (meth)acrylic acid esters are more preferable, and alkyl (meth)acrylates are particularly preferable.

The number of atoms of an alkyl group in alkyl (meth)acrylate is preferably 1 to 30, and these may be linear, branched, or cyclic.

(4) Characteristics of Polar Group-Containing Olefin Copolymer (i) Molecular Structure of Polar Group-Containing Olefin Copolymer The ethylene/unsaturated carboxylic acid ester copolymer and the ethylene/unsaturated carboxylic acid copolymer according to the present invention are polar group-containing olefin copolymers having ethylene and/or an α-olefin having 3 to 20 carbon atoms and one or more unsaturated carboxylic acid ester or unsaturated carboxylic acid (polar group-containing monomer) as a structural unit, and is a random copolymer.

Examples of the molecular structure of the polar group-containing olefin copolymer according to the present invention are shown below. The random copolymer means a copolymer in which the probability of finding each structural unit at a position in an arbitrary molecular chain of the A structural unit and the B structural unit of the molecular structure example shown below is irrelevant to the type of the adjacent structural unit. In addition, the molecular chain terminals of the polar group-containing olefin copolymer may be ethylene or an α-olefin having 3 to 20 carbon atoms, or may be a polar group-containing monomer. As described below, in the molecular structure (example) of the polar group-containing olefin copolymer in the present invention, ethylene and/or an α-olefin having 3 to 20 carbon atoms and a polar group-containing monomer form a random copolymer.

-ABAAAABBAABAAA-

Also referring to the molecular structure (example) of an olefin copolymer into which a polar group has been introduced by graft modification as a reference, a part of the olefin copolymer in which ethylene and/or an α-olefin having 3 to 20 carbon atoms are copolymerized is graft-modified to a polar group-containing monomer.

(ii) Phase Angle δ (G*=0.1 MPa)

The polar group-containing olefin copolymer (ethylene/unsaturated carboxylic acid ester copolymer and ethylene/unsaturated carboxylic acid copolymer) according to the present invention is a polar group-containing olefin copolymer having a random copolymerized substantially linear shape main chain. The fact that the polar group-containing olefin copolymer has "a substantially linear shape main chain" can be confirmed by the phase angle δ at the absolute value G*=0.1 MPa of the complex elastic modulus measured using a rotary rheometer being 45 degrees to 75 degrees.

The phase angle δ (G*=0.1 MPa) is affected by both molecular weight distribution and long chain branching, but as long as the ratio (Mw/Mn) of weight average molecular weight (Mw) to number average molecular weight (Mn) is 4.0 or less, the phase angle δ becomes an index of the amount of long chain branching, and typically, the value of δ (G*=0.1 MPa) increases as the number of long chain branching decreases. That is, if δ is 45 degrees or greater, it can be said to be a copolymer having less long chain branching and a substantially linear shape main chain.

In addition, if Mw/Mn is 1.5 or greater, the value of δ (G*=0.1 MPa) will not exceed 75 degrees even in a case where there is no long chain branching.

The absolute value G* and the phase angle δ are values measured by the method described in examples below.

(iii) Mw/Mn

In the polar group-containing olefin copolymer according to the present invention, the ratio Mw/Mn of the weight average molecular weight (Mw) to the number average molecular weight (Mn) is preferably 1.5 to 4.0, more preferably 1.5 to 3.5, and still more preferably 1.5 to 3.0.

If Mw/Mn is less than 1.5, various processability including forming are not sufficient, and if Mw/Mn exceeds 4.0, mechanical properties become poor. In addition, the value represented by Mw/Mn is referred to as "molecular weight distribution parameter" in some cases.

Mw/Mn is a value measured by the method described in examples below.

(iv) Weight Average Molecular Weight (Mw)

In the polar group-containing olefin copolymer according to the present invention, the weight average molecular weight (Mw) is typically within a range of 1,000 to 2,000,000, preferably 10,000 to 1,500,000, more preferably 20,000 to 1,000,000, and still more preferably 25,000 to 800,000. If Mw is less than 1,000, physical properties such as mechanical strength and impact resistance are not sufficient, and if Mw exceeds 2,000,000, the melt viscosity becomes very high, and due to this, forming process becomes difficult.

The range of Mw can be suitably adjusted depending on the degree of neutralization by the metal ion of the desired ethylene-based ionomer. That is, since the adhesion properties and mechanical properties of an ethylene-based ionomer change depending on the degree of neutralization, in a case where the degree of neutralization is high, Mw is preferably lower within the above range, from the viewpoint of formability.

(v) Melting Point (Tm)

The melting point of the polar group-containing olefin copolymer according to the present invention is indicated by the maximum peak temperature of the endothermic curve measured by a differential scanning calorimeter (DSC). In a case where a plurality of peaks are shown in the endothermic curve obtained when the vertical axis is the heat flow (mW) and the horizontal axis is the temperature (° C.) in DSC measurement, the maximum peak temperature indicates the temperature of the peak whose height from the baseline is the maximum among these, and in a case where there is one peak, the maximum peak temperature indicates the temperature of the peak.

The melting point Tm of the polar group-containing olefin copolymer according to the present invention preferably satisfies the relationship of the following expression (I).

$$50 < Tm < -3.74 \times [Z] + 130 \quad \text{(I)}$$

Here, [Z] represents the total content [Z] (mol %) of the unsaturated carboxylic acid unit and the unsaturated carboxylic acid ester unit included in the polar group-containing olefin copolymer.

The need for the melting point of the polar group-containing olefin copolymer according to the present invention to satisfy the expression (I) will be described below.

As described in the section above, the polar group-containing olefin copolymer according to the present invention is a random copolymer. The random copolymerizability in the copolymer can be confirmed by various methods, and a method of determining the random copolymerizability from the relationship between the comonomer content of the polar group-containing olefin copolymer and the melting point is described in detail in JP-A-2015-163691.

FIG. 1 is a graph showing the relationship between the melting point (copolymer melting point Tm/° C.) and the total content (polar group-containing comonomer content [Z]/mol %) of the unsaturated carboxylic acid and the unsaturated carboxylic acid ester in the copolymer, for an ethylene/unsaturated carboxylic acid ester copolymer produced by a high pressure radical polymerization method which is a production method in the related art, an ethylene/unsaturated carboxylic acid copolymer produced using a Cr catalyst, and the polar group-containing olefin copolymer according to the present invention. Hereinafter, the relationship between the melting point (Tm) and the total content ([Z]) of the unsaturated carboxylic acid and the unsaturated carboxylic acid ester will be described with reference to FIG. 1.

The polar group-containing olefin copolymer produced by a high pressure radical polymerization method in the related art is a random copolymer, and as shown in the circle plots in FIG. 1, it is known that the melting point (Tm, ° C.) and the polar group-containing monomer content [Z] (mol %) in the copolymer almost satisfy the relationship of the following expression (II) (see Skupov, K. M.; Piche, L.; Claverie, J. P. Macromolecules 2008, 41, p. 2309-2310).

The straight line represented by the expression (II) is a straight line represented by a chain line in FIG. 1.

$$Tm = -3.74 \times [Z] + 111 \quad \text{(II)}$$

In addition, in the polar group-containing olefin copolymer produced using a chromium catalyst in the related art, as shown in the square plots in FIG. 1, the melting point (Tm, ° C.) and the polar group-containing monomer content [Z] (mol %) in the copolymer almost satisfy the relationship of the following expression (III) (see PTL 4). The straight line represented by the expression (III) is a straight line represented by a broken line in FIG. 1.

$$Tm = -1.70 \times [Z] + 132.6 \quad \text{(III)}$$

It is considered that the polar group-containing olefin copolymer produced using a chromium catalyst is not a homogeneous random copolymer, and the slope (−1.70) of the straight line of the expression (III) becomes smaller than the slope (−3.74) of the copolymer produced by a radical polymerization method represented by the expression (II). It is considered that this is because, even in a case where the block copolymerizability of the copolymer is high (random copolymerizability is low) and the content of the polar group-containing monomer in the copolymer increases, the ethylene chain is long, and thus, behavior similar to a homopolymer of polyethylene as physical properties of the polymer is shown. Thus, the polar group-containing olefin copolymer produced using a chromium catalyst has thick crystal lamellae, and the number of tie molecules connecting a lamella and a lamella decreases, and as a result, mechanical properties such as impact strength deteriorate. In addition, there is a possibility that the transparency becomes poor, or there is a possibility that bright spots such as a fish eye increase.

In contrast, between the melting point (Tm, ° C.) of the polar group-containing olefin copolymer according to the present invention and the polar group-containing comonomer content [Z] (mol %) in the copolymer, as shown in the rhombus (open diamonds) plots in FIG. 1, the relationship of the following expression (I') is satisfied.

$$Tm < -3.74 \times [Z] + 130 \quad \text{(I')}$$

The right side of the expression (I) corresponds to the straight line represented by the solid line in FIG. 1, and the slope (−3.74) of the straight line is equal to the slope of the random copolymer produced by the radical polymerization method represented by the expression (II). It is considered that this is because, the polar group-containing olefin copolymer according to the present invention is a random copolymer produced using a late transition metal catalyst, and thus, takes a linear slope similar to that of the random copolymer produced by the radical polymerization method in the related art. The reason for taking this slope is not limited to this.

In general, it is known that the branching number and the melting point of a polyethylene chain are in a negative proportional relationship, and the melting point is lowered as the number of branching increases and does not depend on the branching group (see Skupov. K. M.; Piche, L. Claverie. J. P. Macromolecules 2008, 41, p. 2309-2310). That is, as the more branches derived from the α-olefin and/or the polar group-containing monomer are contained in the copolymer, the melting point of the copolymer is lowered, and the heat resistance deteriorates.

For the reasons described above, the polar group-containing olefin copolymer according to the present invention preferably does not have a melting point of $-3.74 \times [Z]+130$ or greater. In addition, if the melting point is 50° C., or lower, the heat resistance becomes poor.

The melting point Tm of the polar group-containing olefin copolymer according to the present invention is not particularly limited as long as it satisfies the relationship of the expression (I), and in the case of assuming polyethylene, the melting point is preferably higher than 50° C., and 140° C., or lower, more preferably 60° C. to 138° C., and most preferably 70° C. to 135° C. If the melting point is lower than this range, the heat resistance is not sufficient, and if the melting point is higher than this range, the impact resistance becomes poor.

(vi) Amount of Aluminum (Al)

The production method of the polar group-containing olefin copolymer according to the present invention will be described below, and since a small amount of organometallic compound is used in the production step, aluminum (Al) is contained in the copolymer in some cases.

The amount of Al (residual amount of aluminum) included in the polar group-containing olefin copolymer is preferably 0 to 100,000 $\mu g_{Al}/g$, more preferably 70,000 $\mu g_{Al}/g$ or less, still more preferably 20,000 $\mu g_{Al}/g$ or less, still more preferably 10,000 $\mu g_{Al}/g$ or less, still more preferably 5,000 $\mu g_{Al}/g$ or less, particularly preferably 1,000 $\mu g_{Al}/g$ or less, and most preferably 500 $\mu g_{Al}/g$ or less, per 1 g of the copolymer. In addition, Al may be not included.

2. Production Method of Ethylene-Based Ionomer

Hereinafter, a production method of the ethylene-based ionomer of the present invention, which is a novel production method will be described.

As a preferred method of producing the ethylene-based ionomer, (1) an ethylene/unsaturated carboxylic acid ester copolymer produced using a specific late transition metal catalyst is prepared from ethylene and/or an α-olefin having 3 to 20 carbon atoms and an unsaturated carboxylic acid ester, (2) then, the ethylene/unsaturated carboxylic acid ester copolymer is subjected to a heating conversion step, and then an ethylene-based ionomer in which the ester group portion has been converted into a metal-containing carboxylate is preferably obtained.

Hereinafter, each step will be described.

(1) Production of Ethylene/Unsaturated Carboxylic Acid Ester Copolymer (i) Constituent Monomer The ethylene/unsaturated carboxylic acid ester copolymer used in the present invention includes ethylene, at least one selected from the group consisting of α-olefins having 3 to 20 carbon atoms, and one or more unsaturated carboxylic acid esters, as constituent monomers.

As the unsaturated carboxylic acid ester, compounds known in the related art can be used, and among these, (meth)acrylic acid ester is preferable, and alkyl (meth) acrylate is more preferable. The number of atoms of an alkyl group in alkyl (meth)acrylate is preferably 1 to 30, and these may be linear, branched, or cyclic.

In addition, the ethylene/unsaturated carboxylic acid ester copolymer of the present invention preferably contains two or more unsaturated carboxylic acid units such as ethyl acrylate, methyl acrylate, and butyl acrylate.

In addition, it is also preferable to contain other comonomer components, and examples of other comonomer components include α-olefin having 3 or more carbon atoms, vinyl ester, and acrylic acid ester. Examples thereof include esters of (meth)acrylic acid such as methyl acrylate, ethyl acrylate, isobutyl acrylate, n-butyl acrylate, and methyl methacrylate, and vinyl acetate.

In particular, in the present invention, as another comonomer component, one or more vinyl esters is preferably contained.

The comonomer component preferably includes ethylene and alkyl (meth)acrylate, and does not contain an α-olefin comonomer other than vinyl ester.

Furthermore, the obtained ethylene/alkyl (meth)acrylate copolymer preferably substantially does not includes short-chain branching other than those derived from copolymerized alkyl (meth)acrylate and vinyl ester.

(ii) Catalyst

The production method of the ethylene/unsaturated carboxylic acid ester copolymer in the present invention is not particularly limited if one satisfying the above characteristics of the ethylene/unsaturated carboxylic acid copolymer in the present invention can be obtained, and a method of producing using a late transition metal complex as described below as a catalyst is preferable.

(ii-1) Late Transition Metal Catalyst

As the late transition metal catalyst used for producing the ethylene/unsaturated carboxylic acid ester copolymer, a method of producing using the late transition metal catalyst represented by the following general formula (1) is more preferable.

$$(\text{Ligand})MRL \tag{1}$$

[In the formula (1), M represents a transition metal of Groups 8 to 11 in the periodic table. Ligand represents one or more atoms selected from the group consisting of an oxygen atom, a nitrogen atom, a phosphorus atom, an arsenic atom, a sulfur atom, and a carbon atom, and is a ligand which chelate-coordinates to M which is the central metal. R represents a ligand forming a σ bond with M. L represents a ligand coordinated to M.]

In the general formula (1), M is a transition metal of Groups 8 to 11 in the periodic table, and is preferably Group 10, and is more preferably nickel (Ni) or palladium (Pd). The valence of this M atom is zero valence, monovalence, or divalence, and preferably zero valence or divalence.

In the general formula (1), ligand represents one or more atoms selected from the group consisting of an oxygen atom, a nitrogen atom, a phosphorus atom, an arsenic atom, a sulfur atom, and a carbon atom, and is a ligand which chelate-coordinates to M which is the central metal. This ligand is preferably a bidentate ligand.

Examples of the atom coordinating to M include nitrogen, oxygen, phosphorus, arsenic, sulfur, and carbon, and nitrogen, oxygen, phosphorus, or sulfur is preferable, and nitrogen, oxygen, or phosphorus is particularly preferable.

The combination of atoms coordinating to M in the bidentate ligand is not particularly limited, and any two elements of the above atoms may be used. For example, if a combination between one type in which a ligand coordinates with M and nitrogen and one type in which a ligand coordinates with oxygen is expressed as "nitrogen-oxygen", the combination of coordinating atoms is preferably nitrogen-nitrogen, nitrogen-oxygen, oxygen-phosphorus, phosphorus-phosphorus, or phosphorus-sulfur.

The bonding mode of the ligand to the central metal atom (M) is not particularly limited, and examples thereof include coordination by lone pair electrons (hereinafter, sometimes referred to as "σ coordination"), π coordination, and a σ bond (bond by atomic orbits oriented in the bond axis direction). Among these, a σ coordination or a σ bond is preferable.

In addition, the bonding mode of a bidentate ligand to M is also not particularly limited, and a bonding mode of arbitrary two of the bonding modes described above can be exemplified. For example, if a combination in which a bidentate ligand coordinates with M with one σ coordination and one σ bond is expressed as "σ coordination-σ bond", σ coordination-σ coordination or σ coordination-σ bond is preferable.

Although only one of a combination of atoms and a combination of coordination modes has been described, the combination means plural. That is, in a case where a combination of nitrogen-oxygen and σ coordination-σ bond is selected, the combination means both nitrogen (σ coordination)-oxygen (σ bond) and nitrogen (σ bond)-oxygen (σ coordination).

In the general formula (1), R is a ligand forming an σ bond with M. The ligand R is not particularly limited as long as it can form a σ bond with M, and examples thereof include a hydrogen atom, a halogen atom, a hydrocarbon group, a halogenated hydrocarbon group, a silicon-containing hydrocarbon group, an oxygen-containing hydrocarbon group, an amino group, a substituted amino group, and a nitrogen-containing hydrocarbon group.

In the general formula (1), L represents a ligand coordinated to M, and L is a hydrocarbon compound having 1 to 20 carbon atoms, having oxygen, nitrogen, or sulfur as an atom capable of a coordination bond. In addition, as L, a hydrocarbon compound (which may contain a heteroatom) having a carbon-carbon unsaturated bond capable of coordinating to a transition metal can also be used.

(ii-2) Phosphine-Phenolate Complex Catalyst (A)

Furthermore, among the late transition metal catalysts represented by the general formula (1), a phosphine-phenolate complex catalyst (A) represented by the following general formula (A) or a phosphine-sulfonate complex catalyst (E) described below is more preferable.

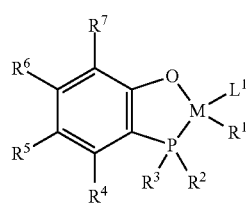

(A)

[In the formula (A), M represents nickel or palladium. $R^1$ represents a hydrogen atom or a hydrocarbon group having 1 to 20 carbon atoms which may contain a heteroatom. $L^1$ represents a ligand coordinated to M. $R^1$ and $L^1$ may be bonded to each other to form a ring. P represents phosphorus. O represents oxygen. $R^2$ and $R^3$ each independently represent a hydrocarbon group having 1 to 30 carbon atoms which may contain a heteroatom and may be bonded to each other to form a ring. $R^4$ to $R^7$ each independently represent a hydrogen atom, a halogen atom, a hydrocarbon group having 1 to 30 carbon atoms which may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $P(O)(OR^8)_2M'$, or an epoxy-containing group (here, $R^8$ represents a hydrocarbon group having 1 to 20 carbon atoms, $R^9$ represents a hydrogen atom or a hydrocarbon group having 1 to 20 carbon atoms, M' represents an alkali metal, an alkali earth metal, ammonium, quaternary ammonium, or phosphonium, x represents an integer of 0 to 3, and y represents an integer of 0 to 2).]

M represents nickel or palladium, and the valence of M is preferably divalent.

Here, the valence of M means the formal oxidation number used in organometallic chemistry. That is, when an electron pair in the bond in which a certain element is involved is assigned to an element having a high electronegativity, the valence indicates the number of charges remaining on the atom of the element.

For example, in the general formula (A) of the present invention, M is nickel, $R^1$ is a phenyl group, and $L^1$ is pyridine, an in a case where the nickel (M) forms a bond with adjacent phosphorus, oxygen, carbon of a phenyl group ($R^1$), or nitrogen of pyridine ($L^1$), the formal oxidation number of nickel, that is, the valence of nickel is divalent. This is because, based on the above definition, in these bonds, electron pairs is assigned to phosphorus, oxygen, carbon, or nitrogen having a higher electronegativity than nickel, and the charge is 0 for phosphorus, −1 for oxygen, −1 for a phenyl group, and 0 for pyridine, and since the complex is electrically neutral as a whole, the charge remaining on nickel becomes +2.

Examples of the divalent M include nickel (II) and palladium (II).

In the general formula (A), $R^1$ represents a hydrogen atom or a hydrocarbon group having 1 to 20 carbon atoms which may contain a heteroatom. It is thought that the polymerization or the copolymerization reaction in the present invention is initiated by inserting the monomer component in the present invention into the bond between M and $R^1$. Therefore, if the carbon number of $R^1$ is too large, handling tends to be difficult. Thus, preferable $R^1$ has 1 to 16 carbon atoms, and $R^1$ has more preferably 1 to 10 carbon atoms.

Specific examples of $R^1$ include a hydride group, a methyl group, an ethyl group, an n-propyl group, an isopropyl group, an n-butyl group, an isobutyl group, an n-hexyl group, an n-octyl group, an n-decyl group, an n-dodecyl group, a cyclopentyl group, a cyclohexyl group, a benzyl group, a phenyl group, a p-methylphenyl group, a trimethylsilyl group, a triethylsilyl group, and a triphenylsilyl group.

In the general formula (A), $L^1$ represents a ligand coordinated to M. The ligand $L^1$ in the present invention is a hydrocarbon compound having 1 to 20 carbon atoms having oxygen, nitrogen, or sulfur as an atom capable of a coordination bond. In addition, as $L^1$, a hydrocarbon compound (which may contain a heteroatom) having a carbon-carbon unsaturated bond capable of coordinating to a transition metal can also be used. The number of carbon atoms in $L^1$ is preferably 1 to 16, and more preferably 1 to 10. In addition, as $L^1$ coordinatively bonded to M in the general formula (A), a compound having no charge is preferable. Preferable examples of $L^1$ in the present invention include pyridines, piperidines, alkyl ethers, aryl ethers, alkylaryl ethers, cyclic ethers, alkylnitrile derivatives, arylnitrile derivatives, alcohols, amides, aliphatic esters, aromatic esters, amines, and cyclic unsaturated hydrocarbons. Examples of more preferable $L^1$ include pyridines, cyclic ethers, aliphatic esters, aromatic esters, and cyclic olefins, and particularly preferable examples of $L^1$ include pyridine, lutidine (dimethylpyridine), picoline (methylpyridine), and $R^9CO_2R^8$ ($R^9$ and $R^8$ are as described above).

$R^1$ and $L^1$ may be bonded to each other to form a ring. Such examples include a cycloocta-1-enyl group, and this is also a preferable aspect in the present invention.

In the general formula (A), $R^2$ and $R^3$ each independently represent a hydrocarbon group having 1 to 30 carbon atoms which may contain a heteroatom and may be bonded to each other to form a ring. $R^2$ and $R^3$ are in the vicinity of the metal M and sterically and/or electronically interact with M. To exert such effects, $R^2$ and $R^3$ are preferably bulky. $R^2$ and $R^3$ each preferably have 3 to 30 carbon atoms, and more preferably have 6 to 30 carbon atoms.

In $R^2$ and $R^3$, examples of the heteroatom included in a heteroatom-containing group include oxygen, nitrogen, phosphorus, sulfur, selenium, silicon, fluorine, and boron. Among these heteroatoms, oxygen, silicon, or fluorine is preferable. In addition, as examples of the heteroatom-containing group including these heteroatoms, examples of the oxygen-containing group include an alkoxy group, an aryloxy group, an acyl group, an allyloyl group, and a carboxylate group, examples of the nitrogen-containing group include an amino group and an amide group, examples of the sulfur-containing group include a thioalkoxy group and a thioaryloxy group, examples of the phosphorus-containing substituent include a phosphino group, examples of the selenium-containing group include a selenyl group, examples of the silicon-containing group include a trialkylsilyl group, a dialkylarylsilyl group, and an alkyldiarylsilyl group, examples of the fluorine-containing group include a fluoroalkyl group and a fluoroaryl group, and examples of the boron-containing group include an alkyl boron group and an aryl boron group. Among these heteroatom-containing groups, an alkoxy group or an aryloxy group is most preferable.

The heteroatom included in the heteroatom-containing group is preferably a heteroatom capable of coordinating to a transition metal. Specific examples of the heteroatom-containing group including such a transition metal-capable heteroatom include the following.

That is, examples of the oxygen-containing group include alkoxy groups such as a methoxy group, an ethoxy group, an n-propoxy group, an isopropoxy group, an n-butoxy group, and a t-butoxy group, aryloxy groups such as a phenoxy group, a p-methylphenoxy group, a p-methoxyphenoxy group, acyl groups such as an acetyl group, allyloyl group such as a benzoyl group, carboxylate groups such as an acetoxy group, an ethyl carboxylate group, a t-butyl carboxylate group, and a phenyl carboxylate group. Examples of the nitrogen-containing group include dialkylamino groups such as a dimethylamino group, a diethylamino group, a di-n-propylamino group, and a cyclohexylamino group. Examples of the sulfur-containing group include thioalkoxy groups such as a thiomethoxy group, a thioethoxy group, a thio-n-propoxy group, a thioisopropoxy group, a thio-n-butoxy group, a thio-t-butoxy group, and a thiophenoxy group and thioaryloxy groups such as a p-methylthiophenoxy group and a p-methoxythiophenoxy group. Examples of the phosphorus-containing substituent include dialkylphosphino groups such as a dimethylphosphino group, a diethylphosphino group, a di-n-propylphosphino group, and a cyclohexylphosphino group. Examples of the selenium-containing group include selenyl groups such as a methylselenyl group, an ethylselenyl group, an n-propylselenyl group, an n-butylselenyl group, a t-butylselenyl group, and a phenylselenyl group.

In the general formula (A), $R^2$ and $R^3$ each independently represent a hydrocarbon group having 1 to 30 carbon atoms which may contain a heteroatom and may be bonded to each other to form a ring, and more specific examples thereof include a linear hydrocarbon group which may contain hydrogen or a heteroatom, a branched hydrocarbon group which may contain a heteroatom, an alicyclic hydrocarbon group which may contain a heteroatom, and an aryl group which may contain a heteroatom. As described above, $R^2$ and $R^3$ are preferably bulky. Therefore, among these, an alicyclic hydrocarbon group which may contain a heteroatom or an aryl group which may contain a heteroatom is preferable, and an aryl group which may contain a heteroatom is most preferable. Examples of the aryl group include a phenyl group, a naphthyl group, an anthracenyl group.

In $R^2$ and $R^3$, in a case where the heteroatom-containing group is bonded to the aromatic skeleton of these aryl groups, as a bonding mode, the heteroatom-containing group may be bonded directly to the aromatic skeleton, or may be bonded to the aromatic skeleton through a spacer such as a methylene group. In a case where the heteroatom-containing group is bonded to an aromatic skeleton through a methylene group, the number of methylene groups is preferably one. In addition, as a substitution position, among the aromatic skeletons in $R^2$ and $R^3$, the ortho position with respect to the carbon bonded to phosphorus is preferable. By doing like this, a spatial arrangement can be taken such that the heteroatom in $R^2$ and $R^3$ has an interaction with M.

Specific examples of preferable $R^2$ and $R^3$ include a 2,6-dimethoxyphenyl group, a 2,4,6-trimethoxyphenyl group, a 4-methyl-2,6-dimethoxyphenyl group, a 4-t-butyl-2,6-dimethoxyphenyl group, a 1,3-dimethoxy-2-naphthyl group, a 2,6-diethoxyphenyl group, a 2,4,6-triethoxyphenyl group, a 4-methyl-2,6-diethoxyphenyl group, a 4-t-butyl-2,6-diethoxyphenyl group, a 1,3-diethoxy-2-naphthyl group, a 2,6-diphenoxyphenyl group, a 2,4,6-triphenoxyphenyl group, a 4-methyl-2,6-diphenoxyphenyl group, a 4-t-butyl-2,6-diphenoxyphenyl group, a 2-methoxy-6-phenoxyphenyl group, a 2-methoxy-4-t-butyl-6-phenoxyphenyl group, a 2,4,6-tri(methoxymethyl)phenyl group, a 4-methyl-2,6-di(methoxymethyl)phenyl group, a 4-t-butyl-2,6-di(methoxymethyl)phenyl group, a 1,3-di(methoxymethyl)-2-naphthyl group, a 2,6-di(phenoxymethyl)phenyl group, a 2,4,6-tri(phenoxymethyl)phenyl group, a 4-methyl-2,6-di(phenoxymethyl)phenyl group, a 4-t-butyl-2,6-di(phenoxymethyl)phenyl group, a 1,3-di(phenoxymethyl)-2-naphthyl group, a 2,6-di(2-methoxyethyl)phenyl group, a 2,4,6-tri(2-methoxyethyl)phenyl group, a 4-methyl-2,6-di(2-methoxyethyl)phenyl group, a 4-t-butyl-2,6-di(2-methoxyethyl)phenyl group, a 1,3-di(2-methoxyethyl)-2-naphthyl group, a 2,6-di(2-phenoxyethyl)phenyl group, a 2,4,6-tri(2-phenoxyethyl)phenyl group, a 4-methyl-2,6-di(2-phenoxyethyl)phenyl group, a 4-t-butyl-2,6-di(2-phenoxyethyl)phenyl group, and a 1,3-di(2-phenoxyethyl)-2-naphthyl group.

Among these, preferable examples include a 2,6-dimethoxyphenyl group, a 2,4,6-trimethoxyphenyl group, a 4-methyl-2,6-dimethoxyphenyl group, a 4-t-butyl-2,6-dimethoxyphenyl group, a 1,3-dimethoxy-2-naphthyl group, a 2,6-diethoxyphenyl group, a 2,4,6-triethoxyphenyl group, a 4-methyl-2,6-diethoxyphenyl group, a 4-t-butyl-2,6-diethoxyphenyl group, a 1,3-diethoxy-2-naphthyl group, a 2,6-diphenoxyphenyl group, a 2,4,6-triphenoxyphenyl group, a 4-methyl-2,6-diphenoxyphenyl group, a 4-t-butyl-2,6-diphenoxyphenyl group, a 2-methoxy-6-phenoxyphenyl group, and a 2-methoxy-4-t-butyl-6-phenoxyphenyl group.

In the formula (A), $R^4$ to $R^7$ each independently represent a hydrogen atom, a halogen atom, a hydrocarbon group having 1 to 30 carbon atoms which may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $P(O)(OR^8)_2M'$, or an epoxy-containing group (here, $R^8$ represents a hydrocarbon group having 1 to 20 carbon atoms, $R^9$ represents a hydrogen atom or a hydrocarbon group having 1 to 20 carbon atoms, M' represents an alkali metal, an alkali earth metal, ammonium, quaternary ammonium, or phosphonium, x represents an integer of 0 to 3, and y represents an integer of 0 to 2).

Preferable examples of $R^4$ to $R^6$ include a hydrogen atom, a fluorine atom, a chlorine atom, a bromine atom, a methyl group, an ethyl group, an isopropyl group, a phenyl group, a trifluoromethyl group, a pentafluorophenyl group, a trimethylsilyl group, a methoxy group, an ethoxy group, a phenoxy group, a nitrile group, a trimethoxysilyl group, a triethoxysilyl group, a trimethylsiloxy group, a trimethoxysiloxy group, sodium sulfonate, potassium sulfonate, sodium phosphate, and potassium phosphate, and particularly preferable examples of $R^4$ to $R^6$ include a hydrogen atom, a fluorine atom, a methyl group, a phenyl group, a trifluoromethyl group, a pentafluorophenyl group, a nitrile group, a trimethylsilyl group, a methoxy group, a phenoxy group, a trimethoxysilyl group, a triethoxysilyl group, a trimethylsiloxy group, a trimethoxysiloxy group, sodium sulfonate, and sodium phosphate.

In addition, $R^7$ is preferably bulky, and preferably has 3 to 30 carbon atoms. Specific examples thereof include an n-butyl group, an isobutyl group, a t-butyl group, a phenyl group, a 1-naphthyl group, a 2-naphthyl group, a 1-anthracenyl group, a 2-anthracenyl group, a 9-anthracenyl group, a 4-t-butylphenyl group, a 2,4-di-t-butylphenyl group, a 9-fluorenyl group, and a cyclohexyl group as the hydrocarbon group, and tri-substituted silyl groups such as a trimethylsilyl group, a triethylsilyl group, a tri-n-propylsilyl group, a dimethylphenylsilyl group, a methyldiphenylsilyl group, and a triphenylsilyl group, and halogenated aryl groups such as a 2,6-difluorophenyl group, a 2,4,6-trifluorophenyl group, and a pentafluorophenyl group, as the heteroatom-containing hydrocarbon group.

Among these, more preferable examples include a t-butyl group, a phenyl group, a 1-naphthyl group, a 2-naphthyl group, a 1-anthracenyl group, a 2-anthracenyl group, a 9-anthracenyl group, a 4-t-butylphenyl group, a 2,4-di-t-butylphenyl group, a 9-fluorenyl group, a cyclohexyl group, a trimethylsilyl group, a triethylsilyl group, a dimethylphenylsilyl group, a methyldiphenylsilyl group, a 2,6-difluorophenyl group, a 2,4,6-trifluorophenyl group, and a pentafluorophenyl group.

Still more preferable examples include a t-butyl group, a phenyl group, a 1-anthracenyl group, a 2-anthracenyl group, a 9-anthracenyl group, a 9-fluorenyl group, a trimethylsilyl group, a triethylsilyl group, a dimethylphenylsilyl group, a methyldiphenylsilyl group, and a pentafluorophenyl group.

(ii-3) Synthetic Method of Phosphine-Phenolate Complex Catalyst (A)

The phosphine-phenolate complex catalyst (A) suitably used in the present invention (hereinafter, also referred to simply as "complex (A)") can be obtained by reacting a compound represented by the following general formula (B) and/or the general formula (C) with a transition metal complex component (D) containing a transition metal M described below.

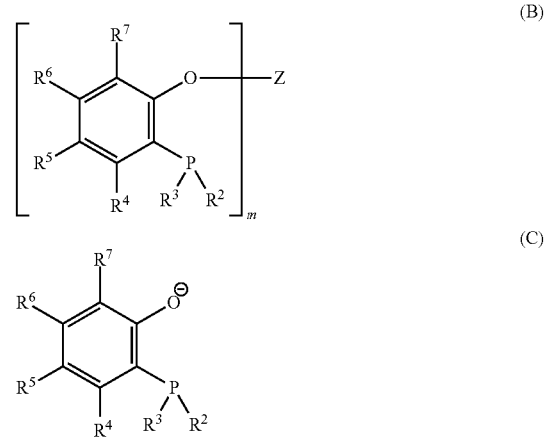

[In the formula (B) or (C), Z represents a hydrogen atom or a leaving group, and m represents the valence of Z. $R^2$, $R^3$, $R^4$, $R^5$, $R^6$, and $R^7$ have the same meaning as those in the general formula (A).]

In the general formula (B), Z is a hydrogen atom or a leaving group, and specific examples thereof include a hydrogen atom, an $R^9SO_2$ group, and a $CF_3SO_2$ group. $R^9$ has the same meaning as that in the general formula (A).

The general formula (C) is represented in the form of an anion, but any counter cation thereof can be used as long as it does not impair the reaction with the transition metal complex component (D) in the present invention. Specific examples of the counter cation include ammonium, quaternary ammonium, phosphonium, and metal ions of Groups 1 to 14 in the periodic table.

Among these, $NH_4^+$, $R^9_4N^+$ (here, $R^9$ may be the same as or different from each other), $R^9_4P^+$ (here, the four $R^9$'s may be the same as or different from each other), $Li^+$, $Na^+$, $K^+$, $Mg^{2+}$, $Ca^{2+}$, or $Al^{3+}$ is preferable, and $R^9_4N^+$ (here, the four $R^9$'s may be the same as or different from each other), $Li^+$, $Na^+$, or $K^+$ is more preferable.

The substances represented by the general formula (B) and/or the general formula (C) can be synthesized by a known synthesis method.

As the transition metal complex component (D), a compound capable of forming a complex having a polymerizability by reacting with the compound represented by the general formula (B) or the general formula (C) is used, and these are sometimes called a precursor.

Example of the transition metal complex component (D) containing nickel include bis(1,5-cyclooctadiene) nickel (0) and complexes represented by the general formula: $(CH_2CR'CH_2)_2Ni$ (R' represents a hydrogen atom, a halogen atom, a hydrocarbon group having 1 to 30 carbon atoms which may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $P(O)(OR^8)_2M'$ or an epoxy-containing group. Here, M', $R^8$, and $R^9$ each have the same meaning as those in formula (A), respectively. x represents an integer of 0 to 3, and y represents an integer of 0 to 2. The same applies to the following), bis(cyclopentadienyl) nickel (2), complexes represented by the general formula: $Ni(CH_2SiR'_3)_2L^1_2$, complexes represented by the general formula: $NiR'_2L^1_2$ (here, $L^1$ has the same meaning as that described in the general formula (A)) can be used.

For the transition metal complex component (D) including a transition metal of Group 9, 10, or 11, the following general formula (2) can be used.

(Here, M is a transition metal of Groups 9, 10, or 11, R' and $L^1$ are as described above, and p and q are integers greater than or equal to 0 that satisfy the valence of M.)

Among these transition metal complex components (D), bis(1,5-cyclooctadiene) nickel (0), complexes represented by the general formula: $(CH_2CR'CH_2)_2Ni$, complexes represented by the general formula: $Ni(CH_2SiR'_3)_2L^1_2$, complexes represented by the general formula: $NiR'_2L^1_2$, $Pd(dba)_2$, $Pd_2(dba)_3$, $Pd_3(dba)_4$ (here, dba represents dibenzylidene acetone), or $Pd(OCOCH_3)_2$ is preferably used.

Bis(1,5-cyclooctadiene) nickel (0), $(CH_2CHCH_2)_2Ni$, $(CH_2CMeCH_2)_2Ni$, $Ni(CH_2SiMe_3)_2(Py)_2$ (hereinafter, Me represents methyl and Py represents pyridine), $Ni(CH_2SiMe_3)_2(Lut)_2$ (hereinafter, Lut represents 2,6-lutidine), $NiPh_2(Py)_2$ (hereinafter, Ph represents phenol), $Ni(Ph)_2(Lut)_2$, $Pd(dba)_2$ (hereinafter, dba represents dibenzylideneacetone). $Pd_2(dba)_3$, $Pd_3(dba)_4$, or $Pd(OCOCH_3)_2$ is particularly preferable.

The complex (A) represented by the general formula (A) is included in the reaction product obtained by reacting the compound represented by the general formula (B) or (C) with the transition metal complex component (D) including the transition metal M in the complex (A) according to the present invention.

The reaction product can be obtained by bringing the compound represented by the general formula (B) or (C) into contact with the transition metal complex component (D) at a ratio of $\{(B)+(C)\}:(D)=1:99$ to 99:1 (molar ratio) in an organic solvent such as toluene or benzene at 0° C. to 100° C. for about 1 second to 24 hours under reduced pressure to increased pressure.

In a case where toluene or benzene solution of bis(1,5-cyclooctadiene) nickel (0) is used as the transition metal complex component (D), by changing the color of the solution from yellow to red, for example, production of a reaction product can be confirmed.

After the reaction between the compound represented by the general formula (B) or the general formula (C) and the transition metal complex component (D), the portion other than the transition metal M of the transition metal complex component (D) is substituted with the portion excluding Z in the general formula (B) or the general formula (C), and as a result, a metal complex represented by the general formula (A) is formed. This substitution reaction is preferably proceed quantitatively, and in some cases, may not proceed completely.

After the reaction ends, other components derived from the compound represented by the general formula (B), and the general formula (C) and/or the general formula (D), in addition to the complex (A) coexist, and when carrying out the polymerization reaction or the copolymerization reaction of the present invention, these other components may be removed or may not be removed. In general, these other components are preferably removed since high activity can be obtained.

When the reaction is carried out, the ligand $L^1$ according to the present invention may coexist. In a case where nickel or palladium is used as M according to the present invention, by making Lewis basic $L^1$ coexist in the system, the stability of the generated complex (A) may increase in some cases, and in such a case, it is preferable to make $L^1$ coexist as long as $L^1$ does not impair the polymerization reaction or copolymerization reaction of the present invention.

In the present invention, the reaction is carried out in advance in a vessel separate from the reactor used for the polymerization of α-olefin and the copolymerization of α-olefin and (meth)acrylic acid ester, the obtained complex (A) may be subjected to polymerization of α-olefin or copolymerization of α-olefin and (meth)acrylic acid ester, and the reaction may be carried out in the presence of these monomers.

In addition, the reaction may be carried out in the reactor used for the polymerization of α-olefin or the copolymerization of α-olefin and (meth)acrylic acid ester. At this time, these monomers may be present or may be absent. In addition, for the components represented by the general formula (B) and/or the general formula (C), each component may be used alone, and a plurality of components may be used in combination. In particular, for the purpose of broadening the molecular weight distribution or the comonomer content distribution, such a plurality of components are usefully used in combination.

(ii-4) Phosphine-Sulfonate Complex Catalyst (E)

In addition, among the late transition metal catalysts represented by the general formula (1), the phosphine-sulfonate complex catalyst (E) represented by the following general formula (E) is also preferable as the complex (A).

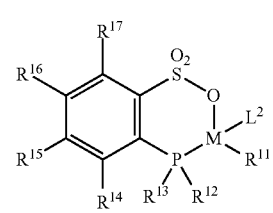

[In the formula (E), M represents nickel or palladium. P is phosphorus, S is sulfur, and O is oxygen. $R^{11}$ represents a hydrogen atom, a halogen atom, an alkyl group having 1 to 30 carbon atoms which may contain a heteroatom or an aryl group having 6 to 30 carbon atoms which may contain a heteroatom. $L^2$ represents a ligand coordinated to M. $R^{12}$ and $R^{13}$ each independently represent a hydrocarbon group having 1 to 30 carbon atoms which may contain a heteroatom and may be bonded to each other to form a ring. $R^{14}$ to $R^{17}$ each independently represent a hydrogen atom, a halogen atom, a hydrocarbon group having 1 to 30 carbon atoms which may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, OSi $(OR^9)_{3-x}(R^9)_x$, $NO_2$, $SO_3M'$, $PO_3M'_2$, $P(O)(OR^8)_2M'$, or an epoxy-containing group (here, $R^8$ represents a hydrocarbon group having 1 to 20 carbon atoms, $R^9$ represents a hydrogen atom or a hydrocarbon group having 1 to 20 carbon atoms. M' represents an alkali metal, an alkali earth metal, ammonium, quaternary ammonium, or phosphonium, x represents an integer of 0 to 3, and y represents an integer of 0 to 2).]

In the general formula (E), $R^{11}$ represents a hydrogen atom, a halogen atom, an alkyl group having 1 to 30 carbon atoms which may contain a heteroatom or an aryl group having 6 to 30 carbon atoms which may contain a heteroatom. Here, the heteroatom is preferably an oxygen atom, a nitrogen atom, a silicon atom, or a halogen atom, and more preferably an oxygen atom.

In a case where $R^{11}$ is an alkyl group having 1 to 30 carbon atoms which may contain a heteroatom, $R^{11}$ is more preferably an alkyl group having 1 to 6 carbon atoms, and preferable specific examples include a methyl group, an ethyl group, a trifluoromethyl group, an acyl group, and an acetoxy group.

In a case where $R^{11}$ is an aryl group having 6 to 30 carbon atoms which may contain a heteroatom, $R^{11}$ is preferably an aryl group having 6 to 13 carbon atoms, and preferable specific examples include a phenyl group, a tolyl group, a xylyl group, a phenanthryl group, and a pentafluorophenyl group.

Among these, particularly preferable specific examples of $R^{11}$ include a hydrogen atom, a methyl group, and a phenyl group.

In the general formula (E), $L^2$ represents a ligand coordinated to M. The ligand $L^2$ is preferably a hydrocarbon compound having 1 to 20 carbon atoms having oxygen, nitrogen, or sulfur as an atom capable of a coordination bond to M. In addition, as $L^2$, a hydrocarbon compound (which may contain a heteroatom) having a carbon-carbon unsaturated bond capable of coordinating to a transition metal can also be used.

The number of carbon atoms in $L^2$ is preferably 1 to 16, and more preferably 1 to 10.

In addition, as $L^2$ coordinatively bonded to M in the general formula (E), a compound having no charge is preferable.

Preferable examples of $L^2$ include pyridines, piperidines, alkyl ethers, aryl ethers, alkylaryl ethers, cyclic ethers, alkylnitrile derivatives, arylnitrile derivatives, alcohols, amides, aliphatic esters, aromatic esters, amines, and cyclic unsaturated hydrocarbons.

Examples of more preferable $L^2$ include pyridines, cyclic ethers, aliphatic esters, aromatic esters, and cyclic olefins, and particularly preferable examples of $L^2$ include pyridine, lutidine (dimethylpyridine), picoline (methylpyridine), and $R^9 CO_2 R^8$. $R^8$ and $R^9$ each are as describe above.

$R^{11}$ and $L^2$ may be combined to form a π-allyl bond mode represented by the following general formula (E-1) (the general formula (E-1) shows only a portion where M, $R^{11}$, and $L^2$ in the general formula (E) are combined to form a π-allyl bond).

(E-1)

[in the formula (E-1), $R^{10}$'s each independently represent a hydrogen atom, a halogen atom, a hydrocarbon group having 1 to 30 carbon atoms which may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $P(O)(OR^8)_2M'$, or an epoxy-containing group (here, $R^8$ represents a hydrocarbon group having 1 to 20 carbon atoms, $R^9$ represents a hydrogen atom or a hydrocarbon group having 1 to 20 carbon atoms, M' represents an alkali metal, an alkali earth metal, ammonium, quaternary ammonium, or phosphonium, x represents an integer of 0 to 3, and y represents an integer of 0 to 2).]

In the general formula (E), $R^{12}$ and $R^{13}$ each independently represent a hydrocarbon group having 1 to 30 carbon atoms which may contain a heteroatom and may be bonded to each other to form a ring. $R^{12}$ and $R^{13}$ are in the vicinity of the metal M and sterically and/or electronically interact with M. To exert such effects, $R^{12}$ and $R^{13}$ are preferably bulky. $R^{12}$ and $R^{13}$ each preferably have 3 to 30 carbon atoms, and more preferably have 6 to 30 carbon atoms.

In addition, $R^{12}$ and $R^{13}$ preferably have an aromatic skeleton, and is preferably an aryl group which may contain a heteroatom.

In $R^{12}$ and $R^{13}$, as the substitution position of the above-described hydrocarbon group which may contain heteroatoms in the aromatic skeletons of these aryl groups, among the aromatic skeletons in $R^{12}$ and $R^{13}$, the ortho position with respect to the carbon bonded to phosphorus is preferable. By doing like this, a spatial arrangement can be taken such that the heteroatom in $R^{12}$ and $R^{13}$ has an interaction with M.

The hydrocarbon group which may contain a heteroatom is a hydrocarbon group having 1 to 10 carbon atoms, an alkoxy group or an aryloxy group having 1 to 10 carbon atoms, having oxygen.

Examples of the hydrocarbon group include a methyl group, an ethyl group, an n-propyl group, an isopropyl group, an n-butyl group, an isobutyl group, a t-butyl group, a cyclopentyl group, and a cyclohexyl group, and among these, a methyl group, an ethyl group, an n-propyl group, an isopropyl group, an n-butyl group, or a cyclohexyl group is preferable, and a methyl group, an ethyl group, an isopropyl group, or a cyclohexyl group is more preferable.

As the alkoxy group and the aryloxy group having 1 to 10 carbon atoms and having oxygen, a methoxy group, an ethoxy group, a phenoxy group, or a 2-methylphenoxy group is preferable, and a methoxy group or a phenoxy group is preferable.

Specific examples of preferable $R^{12}$ and $R^{13}$ include a 2-methylphenyl group, a 2,6-dimethylphenyl group, a 2-ethylphenyl group, a 2,6-diethylphenyl group, a 2-isopropylphenyl group, a 2,6-di(isopropyl)phenyl group, a 2-cyclohexylphenyl group, a 2,6-di(cyclohexyl)phenyl group, a 2-methoxyphenyl group, 2,6-dimethoxyphenyl group, 2-phenoxyphenyl group, and a 2,6-diphenoxy group.

Among these, preferable examples thereof include a 2-methylphenyl group, a 2-ethylphenyl group, a 2-isopropylphenyl group, a 2-cyclohexylphenyl group, a 2-methoxyphenyl group, a 2,6-dimethoxyphenyl group, a 2-phenoxyphenyl group, and a 2,6-diphenoxy group.

Particularly preferable examples thereof include a 2-isopropylphenyl group, a 2-cyclohexylphenyl group, a 2-methoxyphenyl group, a 2,6-dimethoxyphenyl group, a 2-phenoxyphenyl group, and a 2,6-diphenoxy group.

In the formula (E), $R^{14}$ to $R^{17}$ each independently represent a hydrogen atom, a halogen atom, a hydrocarbon group having 1 to 30 carbon atoms which may contain a heteroatom, $OR^8$, $CO_2R^8$, $CO_2M'$, $C(O)N(R^9)_2$, $C(O)R^8$, $SR^8$, $SO_2R^8$, $SOR^8$, $OSO_2R^8$, $P(O)(OR^8)_{2-y}(R^9)_y$, CN, $NHR^8$, $N(R^8)_2$, $Si(OR^9)_{3-x}(R^9)_x$, $OSi(OR^9)_{3-x}(R^9)_x$, $NO_2$, $SO_3M'$, $PO_3M'_2$, $P(O)(OR^8)_2M'$, or an epoxy-containing group (here, $R^8$ represents a hydrocarbon group having 1 to 20 carbon atoms, $R^9$ represents a hydrogen atom or a hydrocarbon group having 1 to 20 carbon atoms, M' represents an alkali metal, an alkali earth metal, ammonium, quaternary ammonium, or phosphonium, x represents an integer of 0 to 3, and y represents an integer of 0 to 2).

Among these, preferable examples thereof include a hydrogen atom, a fluorine atom, a chlorine atom, a bromine atom, a methyl group, an ethyl group, an isopropyl group, a cyclohexyl group, a phenyl group, a trifluoromethyl group, a pentafluorophenyl group, a trimethylsilyl group, a dimethylphenylsilyl group, a methyldiphenylsilyl group, a triphenylsilyl group, a methoxy group, an ethoxy group, a phenoxy group, a 2-methylphenoxy group, a nitrile group, a trimethoxysilyl group, a triethoxysilyl group, a trimethylsiloxy group, a trimethoxysiloxy group, sodium sulfonate, potassium sulfonate, sodium phosphate, and potassium phosphate, and particularly preferable examples include a hydrogen atom, a methyl group, an ethyl group, an isopropyl group, a cyclohexyl group, a phenyl group, a trifluoromethyl group, a pentafluorophenyl group, a trimethylsilyl group, a dimethylphenylsilyl group, a methyldiphenylsilyl group, a triphenylsilyl group, a methoxy group, an ethoxy group, a phenoxy group, a 2-methylphenoxy group, a trimethoxysilyl group, a triethoxysilyl group, a trimethylsiloxy group, and a trimethoxysiloxy group.

(ii-5) Synthetic Method of Phosphine-Sulfonate Complex Catalyst (E)

The phosphine-sulfonate complex catalyst (E) suitably used in the present invention (hereinafter, also referred to as "complex (E)") can be obtained by reacting a compound represented by the following general formula (F) and/or the general formula (G) with a transition metal complex component (H) described below.

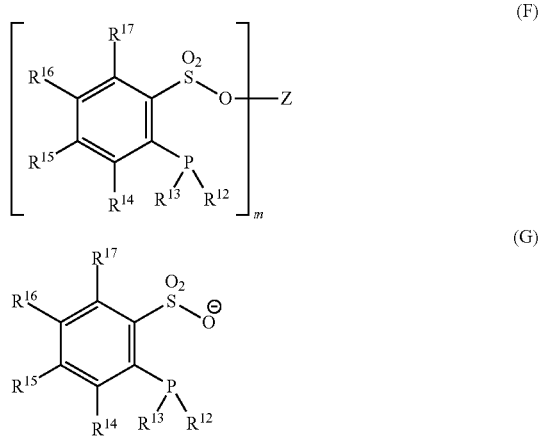

(In the formula (F) or (0), Z represents a hydrogen atom or a leaving group, and m represents the valence of Z. $R^{12}$, $R^{13}$, $R^{14}$, $R^{15}$, $R^{16}$, and $R^{17}$ have the same meaning as those in the general formula (E).)

In the general formula (F), Z is a hydrogen atom or a leaving group, and specific examples thereof include a hydrogen atom, an $R^9SO_2$ group (here, $R^9$ is as described above), and a $CF_3SO_2$ group.

The general formula (G) is represented in the form of an anion, but any counter cation thereof can be used as long as it does not impair the reaction with the transition metal complex component (H) according to the present invention. Specific examples of the counter cation include ammonium, quaternary ammonium, phosphonium, and metal ions of Groups 1 to 14 in the periodic table. Among these, $NH_4^+$, $R^9_4N^+$ (here, $R^9$ is as described above, and four $R^9$'s may be the same as or different from each other), $R^9_4P^+$ (here, $R^9$ is as described above, and four $R^9$'s may be the same as or different from each other), $Li^+$, $Na^+$, $K^+$, $Mg^{2+}$, $Ca^{2+}$, or $Al^{3+}$ is preferable, and $R^9_4N^+$ (here, $R^9$ is as described above, and four $R^9$'s may be the same as or different from each other), $Li^+$, $Na^+$, or $K^+$ is more preferable.

The substances represented by the general formula (F) and/or the general formula (G) can be synthesized by a known synthesis method. The complex (E) is included in the reaction product obtained by reacting the compound represented by the general formula (F) or (G) with the transition metal complex component (H) including the metal M.

For the transition metal complex component (H) used in the present invention, a compound capable of forming a complex having a polymerizability by reacting with the compound represented by the general formula (F) or (G) is used. These are sometimes called a precursor.

The transition metal complex component (H) is synthesized by using bis(dibenzylideneacetone)palladium, tetrakis(triphenylphosphine)palladium, palladium sulfate, palladium acetate, bis(allylpalladiumchloride), palladium chloride, palladium bromide, (cyclooctadiene)palladium(methyl)chloride, dimethyl(tetramethylethylenediamine)palladium, bis(cyclooctadiene)nickel, nickel chloride, nickel bromide, (tetramethylethylenediamine)nickel(methyl)chloride, dimethyl(tetramethylethylenediamine)nickel, or (cyclooctadiene)nickel(methyl)chloride.

The complexation reaction may be carried out in a reactor used for copolymerization with α-olefin or in a vessel separate from the reactor. After the complexation, the metal complex is extracted and isolated and the resulting product may be used as a catalyst, or may be used as a catalyst without being isolated. Furthermore, it is possible to carry out in the presence of a porous carrier described below.

The catalyst composition of the present invention may be used alone, or a plurality of catalyst compositions may be used in combination. In particular, for the purpose of broadening the molecular weight distribution or the comonomer content distribution, such a plurality of catalyst compositions are usefully used in combination.

(iii) Polymerization Method of Ethylene and Unsaturated Carboxylic Acid Ester

In the present invention, an ethylene/unsaturated carboxylic acid ester copolymer is produced from at least one selected from the group consisting of ethylene and α-olefins having 3 to 20 carbon atoms and one or more unsaturated carboxylic acid esters preferably using the late transition metal catalyst described above.

As the late transition metal catalyst, the complex (A) or the complex (E) described above can be suitably used as a catalyst component for polymerization or copolymerization.

In a case where the complex (A) or the complex (E) is used as a catalyst component, the isolated complex may be used, or the complex supported on a carrier may be used. Such supporting may be carried out in the reactor used for copolymerization of ethylene and/or α-olefin having 3 to 20 carbon atoms and an unsaturated carboxylic acid ester in the presence or absence of these monomers, or may be carried out in a vessel separate from the reactor.

(iii-1) Catalyst Carrier

As a usable carrier, any carrier can be used as long as it does not depart from the gist of the present invention. In general, inorganic oxides or polymer carriers can be suitably used.

Specific examples thereof include $SiO_2$, $Al_2O_3$, MgO, $ZrO_2$, $TiO_2$, $B_2O_3$, CaO, ZnO, BaO, $ThO_2$, and mixtures thereof, and mixed oxide such as $SiO_2$—$Al_2O_3$, $SiO_2$—$V_2O_5$, $SiO_2$—$TiO_2$, $SiO_2$—MgO, or $SiO_2$—$Cr_2O_3$ can also be used, and inorganic silicate, a polyethylene carrier, a polypropylene carrier, a polystyrene carrier, a polyacrylic acid carrier, a polymethacrylic acid carrier, a polyacrylic acid ester carrier, a polyester carrier, a polyamide carrier, or a polyimide carrier can be used.

For these carriers, a particle size, a particle size distribution, a pore volume, a specific surface area, and the like are not particularly limited, and any one can be used.

As the inorganic silicate used as the carrier, clay, clay mineral, zeolite, diatomaceous earth, and the like can be used. These may be synthesized products, or naturally produced minerals may be used.

As specific examples of clay and clay mineral include allophanes such as allophane, kaolins such as dickite, nacrite, kaolinite, and anauxite, halloysites such as metahalloysite and halloysite, serpentines such as chrysotile, lizardite, and antigorite, smectites such as montmorillonite, sauconite, beidellite, nontronite, saponite, and hectorite, vermiculite minerals such as vermiculite, mica minerals such as Illite, sericite, and glauconite, attapulgite, sepiolite, palygorskite, bentonite, kibushi clay, gairome clay, hisingerite, pyrophyllite, and chlorite group. These may form a mixed layer.

Examples of synthetic products include synthetic mica, synthetic hectorite, synthetic saponite, and synthetic taeniolite. Among these specific examples, kaolins such as dickite, nacrite, kaolinite, and anauxite, halloysites such as metahalloysite and halloysite, serpentines such as chrysotile, lizardite, and antigorite, smectites such as montmorillonite, sauconite, beidellite, nontronite, saponite, and hectorite, vermiculite minerals such as vermiculite, mica minerals such as Illite, sericite, and glauconite, synthetic mica, synthetic hectorite, synthetic saponite, or synthetic taeniolite is preferable, and smectites such as montmorillonite, sauconite, beidellite, nontronite, saponite, and hectorite, vermiculite minerals such as vermiculite, synthetic mica, synthetic hectorite, synthetic saponite, or synthetic taeniolite is particularly preferable.

These carriers may be used as they are, or may be subjected to an acid treatment with hydrochloric acid, nitric acid, or sulfuric acid and/or a salt treatment with LiCl, NaCl, KCl, $CaCl_2$, $MgCl_2$, $Li_2SO_4$, $MgSO_4$, $ZnSO_4$, $Ti(SO_4)_2$, $Zr(SO_4)_2$, or $Al_2(SO_4)_3$. In the treatment, the treatment may be carried out by generating a salt in the reaction system by mixing the corresponding acid and base. In addition, shape control or a drying treatment such as pulverization or granulation may be carried out.

(iii-2) Polymerization Solvent

The polymerization reaction of ethylene and/or α-olefin having 3 to 20 carbon atoms with an unsaturated carboxylic acid ester in the present invention can be carried out in the presence or absence of a hydrocarbon solvent such as propane, n-butane, isobutane, n-hexane, n-heptane, toluene, xylene, cyclohexane, or methylcyclohexane, or liquid such as liquefied α-olefin, and a polar solvent such as diethyl ether, ethylene glycol dimethyl ether, tetrahydrofuran, dioxane, ethyl acetate, methyl benzoate, acetone, methyl ethyl ketone, formamide, acetonitrile, methanol, isopropyl alcohol, or ethylene glycol. In addition, a mixture of the liquid compounds described here may be used as a solvent. Furthermore, ionic liquid can also be used as a solvent. To obtain high polymerization activity and high molecular weight, the above-described hydrocarbon solvent and ionic liquid are more preferable.

(iii-3) Polymerization Additive

In the present invention, the polymerization reaction can be carried out in the presence or absence of a known additive. As the additive, a polymerization inhibitor for inhibiting radical polymerization or an additive having an action of stabilizing the generated copolymer is preferable.

For example, quinone derivatives or hindered phenol derivatives are mentioned as examples of preferable additives.

Specifically, monomethyl ether hydroquinone, 2,6-di-t-butyl-4-methylphenol (BHT), a reaction product of trimethylaluminum with BHT, a reaction product of alkoxide of tetravalent titanium with BHT, or the like can be used.

In addition, as additives, inorganic and/or organic fillers are used, and polymerization may be carried out in the presence of these fillers. Furthermore, $L^1$ according to the present invention or an ionic liquid may be used as an additive.

A preferable additive in the present invention, a Lewis base is exemplified. By selecting a suitable Lewis base, it is possible to improve activity, a molecular weight, copolymerizability of acrylic acid ester.

The amount of the Lewis base is 0.0001 equivalents to 1000 equivalents, preferably 0.1 equivalents to 100 equivalents, and more preferably 0.3 equivalents to 30 equivalents, with respect to the transition metal M in the catalyst component present in the polymerization system.

The method of adding a Lewis base to the polymerization system is not particularly limited, and any method can be used. For example, the Lewis base may be added by mixing with the catalyst component of the present invention, may be added by mixing with a monomer, or may be added to the polymerization system independently on the catalyst component or the monomer.

In addition, a plurality of Lewis bases may be used in combination. In addition, the same Lewis base as $L^1$ according to the present invention may be used, or a Lewis base different from $L^1$ according to the present invention may be use.

Examples of the Lewis base include aromatic amines, aliphatic amines, alkyl ethers, aryl ethers, alkylaryl ethers, cyclic ethers, alkyl nitriles, aryl nitriles, alcohols, amides, aliphatic esters, aromatic esters, phosphates, phosphites, thiophenes, thianthrenes, thiazoles, oxazoles, morpholines, and cyclic unsaturated hydrocarbons. Among these, particularly preferred Lewis bases are aromatic amines, aliphatic amines, cyclic ethers, aliphatic esters, aromatic esters, and among these, preferable Lewis bases are pyridine derivatives, pyrimidine derivatives, piperidine derivatives, imidazole derivatives, aniline derivatives, piperidine derivatives, triazine derivatives, pyrrole derivatives, and furan derivatives.

Examples of specific Lewis base compound include pyridine, pentafluoropyridine, 2,6-lutidine, 2,4-lutidine, 3,5-lutidine, pyrimidine, N,N-dimethylaminopyridine. N-methylimidazole, 2,2'-bipyridine, aniline, piperidine, 1,3,5-triazine, 2,4,6-tris(trifluoromethyl)-1,3,5-triazine, 2,4,6-tris(2-pyridyl)-s-triazine, quinoline, 8-methylquinoline, phenazine, 1,10-phenanthroline, N-methylpyrrole, 1,8-diazabicyclo-[5.4.0]-undeca-7-ene, 1,4-diazabicyclo-[2,2,2]octane, triethylamine, benzonitrile, picoline, triphenylamine, N-methyl-2-pyrrolidone, 4-methylmorpholine, benzoxazole, benzothiazole, furan, 2,5-dimethylfuran, dibenzofuran, xanthene, 1,4-dioxane, 1,3,5-trioxane, dibenzothiophene, thianthrene, triphenylphosphonium cyclopentadienide, triphenyl phosphite, triphenyl phosphate, tripyrrolidinophosphine, and tris(pyrrolidino)borane.

(iii-4) Organometallic Compound

In the present invention, after bring the unsaturated carboxylic acid ester into contact with a small amount of an organometallic compound, by copolymerizing with ethylene and/or α-olefin having 3 to 20 carbon atoms in the presence of the late transition metal catalyst, the polymerization activity can be further enhanced.

The organometallic compound is an organometallic compound including a hydrocarbon group which may have a substituent, and can be represented by the following general formula (H).

$$R^{30}{}_n M^{30} X^{30}{}_{m-n} \quad \text{(H)}$$

(In the formula, $R^{30}$ represents a hydrocarbon group having 1 to 12 carbon atoms which may have a substituent, $M^{30}$ represents a metal selected from the group consisting of Group 1, Group 2, Group 12, and Group 13 of the periodic table, $X^{30}$ represents a halogen atom or a hydrogen atom, m is the valency of $M^{30}$, and n is an integer of 1 to m.)

Examples of the organometallic compound represented by the general formula (H) include alkylaluminums such as tri-n-butylaluminum, tri-n-hexylaluminum, tri-n-octylaluminum and tri-n-decylaluminum, and alkylaluminum halides such as methylaluminum dichloride, ethylaluminum dichloride, dimethylaluminum chloride, diethylaluminum chloride, and diethylaluminum ethoxide, and trialkylaluminum is preferably selected. A trialkylaluminum having a hydrocarbon group having 4 or more carbon atoms can be more preferably selected, a trialkylaluminum having a hydrocarbon group having 6 or more carbon atoms can be still more preferably selected, tri-n-hexylaluminum, tri-n-octylaluminum, and tri-n-decylaluminum are more suitably selected, and tri-n-octylaluminum can be most suitably used.

The organometallic compound is preferably come into contact in an amount such that the molar ratio to the unsaturated carboxylic acid ester becomes $10^{-5}$ to 0.9, preferably from $10^{-4}$ to 0.2, and more preferably from $10^{-4}$ to 0.1, from the viewpoint of polymerization activity and cost.

(Residual Amount of Aluminum (Al))

The amount of aluminum (Al) remaining in 1 g of the obtained ethylene/unsaturated carboxylic acid ester copolymer and the ethylenically unsaturated carboxylic acid copolymer (polar group-containing olefin copolymer) is preferably 100,000 $\mu g_{Al}/g$ or less, more preferably 70,000 $\mu g_{Al}/g$ or less, still more preferably 20,000 $\mu g_{Al}/g$ or less, still more preferably 10,000 $\mu g_{Al}/g$ or less, still more preferably 5,000 $\mu g_{Al}/g$ or less, particularly preferably 1,000 $\mu g_{Al}/g$ or less, and most preferably 500 $\mu g_{Al}/g$ or less. In a case where the amount of remaining aluminum is more than this, decrease in mechanical properties of the polar group-containing olefin copolymer and discoloration or acceleration of deterioration of the polymerization product occur. It is better that the residual amount of aluminum (Al) is as small as possible in the possible range, and for example, the residual amount may an extremely small amount of 1 $\mu g_{Al}/g$, or may be 0 $\mu g_{Al}/g$ (not included). "$\mu g_{Al}/g$" means that the amount of aluminum (Al) included in 1 g of the polar group-containing olefin copolymer is expressed in a $\mu g$ unit.

(Amount of Aluminum (Al))

The amount of aluminum (Al) included in the polar group-containing olefin copolymer according to the present invention can be calculated as a value obtained by dividing the amount of aluminum contained in the alkylaluminum subjected to polymerization by the yield of the obtained polar group-containing olefin copolymer.

In addition, although the amount of aluminum (Al) included in the polar group-containing olefin copolymer is calculated from the polymerization charge amount of alkylaluminum, the amount of aluminum (Al) may be measured by fluorescent X-ray analysis or inductively coupled plasma emission (ICP) analysis. In the case of using fluorescent X-ray analysis or inductively coupled plasma emission (ICP) analysis, for example, the amount of aluminum (Al) can be measured by the following method such as fluorescent X-ray analysis or inductively coupled plasma emission (ICP) analysis.

1) Fluorescent X-Ray Analysis 3 to 10 g of a measurement sample is weighed, and this is heat and pressure-molded using a heating press machine to produce a flat plate sample having a diameter of 45 mm. The measurement is carried out on the portion having a central portion diameter of 30 mm of the flat plate sample, and the measurement is carried out under the following conditions using a scanning fluorescent X-ray analyzer "ZSX 100e" (Rh tube bulb of 4.0 kW) manufactured by Rigaku Corporation.

X-ray output: 50 kV to 50 mA
Spectroscopic crystal: PET
Detector: PC (proportional counter)
Detection ray: Al-Kα ray The aluminum content can be determined from the calibration curve created in advance and the result measured under the above conditions. The calibration curve can be manufactured by measuring the aluminum content of a plurality of polyethylene resins by ICP analysis and further carrying fluorescent X-ray analysis on these polyethylene resins under the above conditions.

2) Inductively Coupled Plasma Emission (ICP) Analysis

A measurement sample, 3 ml of special grade nitric acid, and 1 ml of hydrogen peroxide water (hydrogen peroxide content of 30% by weight) are put into a container made of Teflon (registered trademark), and using a microwave decomposition apparatus (MLS-1200 MEGA manufactured by Milestone General K.K.), thermal decomposition operation is carried out at a maximum 500 W to make the measurement sample a solution. By subjecting the solubilized measurement sample to an ICP emission spectroscopic analyzer (IRIS-AP manufactured by THERMO JARRELL ASH CORP.), the aluminum content can be measured. Determination of the aluminum content is carried out using a calibration curve created using a standard solution whose the aluminum element concentration is known.

(iii-5) Polymerization Type

In the present invention, the polymerization type is not particularly limited. Slurry polymerization in which at least a part of the generated polymer becomes a slurry in the medium, bulk polymerization in which the liquefied monomer itself is used as a medium, gas phase polymerization which is carried out in a vaporized monomer, or high-pressure ionic polymerization in which at least a part of the generated polymer is dissolved in a monomer liquefied at high temperature and high pressure is preferably used. In addition, any type of batch polymerization, semibatch polymerization, and continuous polymerization may be used. In addition, living polymerization may be used, and polymerization may be carried out while concurrently occurring chain transfer. Furthermore, chain shuttling or coordinative chain transfer polymerization (CCTP) may be carried out by using in combination with a so-called chain transfer agent (CSA).

The unreacted monomers or the medium may be used after being separated from the generated copolymer and recycled. At the time of recycling, these monomers and or the medium may be purified and reused, or may be reused without purification. To separate the generated copolymer from the unreacted monomers and the medium, a method known in the related art can be used. For example, filtration, centrifugation, solvent extraction, reprecipitation using a poor solvent, or the like can be used.

Although the polymerization temperature, the polymerization pressure, and the polymerization time are not particularly limited, typically, optimum settings can be carried out in consideration of productivity or process capability from the following ranges. That is, the polymerization temperature can be selected from typically a range of −20° C. to 290° C. and preferably 0° C. to 250° C., the copolymerization pressure can be selected from a range of 0.1 MPa to 300 MPa and preferably 0.3 MPa to 250 MPa, and the polymerization time can be selected from a range of 0.1 minutes to 10 hours, preferably 0.5 minutes to 7 hours, and more preferably 1 minute to 6 hours.

In the present invention, in general, polymerization is carried out in an inert gas atmosphere. For example, a nitrogen atmosphere, an argon atmosphere, or a carbon dioxide atmosphere can be used, and a nitrogen atmosphere is preferably used. A small amount of oxygen or air may be mixed in.

The supply of the catalyst and the monomer to the polymerization reactor is also not particularly limited, various supply methods can be adopted depending on the purpose. For example, in the case of batch polymerization, a method in which a predetermined amount of monomer is supplied to the polymerization reactor in advance, and a catalyst is supplied thereto can also be adopted. In this case, additional monomer or additional catalyst may be supplied to the polymerization reactor. In addition, in the case of continuous polymerization, a method in which by continuously or intermittently supplying a predetermined amount of monomer and catalyst to the polymerization reactor, polymerization reaction is continuously carried out can be adopted.

(iii-6) Polymerization Control

Regarding the control of the composition of the copolymer, a method in which a plurality of monomers is supplied to a reactor and polymerization is controlled by changing the supply ratio thereof can be generally used. In addition, a method in which the copolymerization composition is controlled by using the difference in the monomer reactivity ratio due to the difference in catalyst structure, and a method in which the copolymerization composition is controlled by using the polymerization temperature dependence of the monomer reactivity ratio can be exemplified.

For controlling the molecular weight of a polymer, a method known in the related art can be used. That is, a method of controlling the molecular weight by controlling the polymerization temperature, a method of controlling the molecular weight by controlling the monomer concentration, a method of controlling the molecular weight using a chain transfer agent, and a method of controlling the molecular weight by controlling the ligand structure in a transition metal catalyst can be exemplified. In a case where a chain transfer agent is used, a chain transfer agent known in the related art can be used. For example, hydrogen, metal alkyl, or the like can be used.

In addition, in a case where an unsaturated carboxylic acid ester component itself becomes a kind of chain transfer agent, the molecular weight can also be adjusted by controlling the ratio of the unsaturated carboxylic acid ester component to the ethylene component and the concentration of the unsaturated carboxylic acid ester component. In a case where the molecular weight is adjusted by controlling the ligand structure in a transition metal catalyst, a tendency that the molecular weight generally is increased by controlling the kind, number, and disposition of the heteroatom-containing group in $R^2$, $R^3$, $R^{12}$, or $R^{13}$, or by disposing of the bulky substituent around the metal M, can be used. It is preferable to dispose an electron donating group such that an electron donating group such as an aryl group or a heteroatom-containing substituent becomes capable of interacting the metal M. Whether such an electron donating group is capable of interacting with the metal M or not is generally can be determined by measuring the distance between the electron donating group and the metal M in a molecular model or molecular orbital calculation.

(2) Heating Conversion Step of Ethylene/Unsaturated Carboxylic Acid Ester Copolymer An ethylene-based ionomer can be obtained through a heating conversion step of heating the ethylene/unsaturated carboxylic acid ester copolymer and of converting the ester group in the copolymer into a metal-containing carboxylate containing a metal ion of Group 1, 2, or 12 of the periodic table.

In addition, in the heating conversion step, (i) by heating an ethylene/unsaturated carboxylic acid ester copolymer, and after converting into an ethylene/unsaturated carboxylic acid copolymer by hydrolysis or thermal decomposition, by reacting with a compound containing a metal ion of Group 1, 2, or 12 of the periodic table, the carboxylic acid in the ethylene/unsaturated carboxylic acid copolymer may be converted into the metal-containing carboxylate, and (ii) by heating an ethylene/unsaturated carboxylic acid ester copolymer, and by reacting with a compound containing a metal ion of Group 1, 2, or 12 of the periodic table while hydrolyzing or thermally decomposing the ester group of the copolymer, the ester group portion in the ethylene/unsaturated carboxylic acid ester copolymer may be converted into the metal-containing carboxylate.

In the above (i), after ethylene/unsaturated carboxylic acid ester copolymer is hydrolyzed or thermally decomposed into an ethylene/unsaturated carboxylic acid copolymer, a neutralization reaction of the ethylene/unsaturated carboxylic acid copolymer with metal ions is carried out. The conditions of the neutralization reaction in this case are not particularly limited, and the neutralization reaction can be carried out by a method known in the related art. For example, while melt-kneading the ethylene/unsaturated carboxylic acid copolymer with a screw extruder or the like, the reaction with metal ions can be carried out. By the neutralization reaction, the carboxylic acid of the copolymer is converted to metal-containing carboxylate.

In the above (i), when the ethylene/unsaturated carboxylic acid ester copolymer is hydrolyzed or thermally decomposed, as an additive for accelerating the reaction, an acid/base catalyst known in the related art may be used. The acid/base catalyst known not particularly limited, and for example, hydroxides of alkali metals or alkali earth metals such as sodium hydroxide, potassium hydroxide, and lithium hydroxide, alkali metals such as sodium hydrogencarbonate and sodium carbonate, carbonates of an alkaline earth metal, solid acids such as montmorillonite, inorganic acids such as hydrochloric acid, nitric acid, and sulfuric acid, and organic acids such as formic acid, acetic acid, benzoic acid, citric acid, paratoluenesulfonic acid, trifluoroacetic acid, and trifluoromethanesulfonic acid can be suitably used.

From the viewpoints of reaction acceleration effects, price, equipment corrosiveness, or the like, sodium hydroxide, potassium hydroxide, sodium carbonate, or paratoluenesulfonic acid is preferable, and paratoluenesulfonic acid is more preferable.

In addition, in the above (ii), while carrying out hydrolysis or thermal decomposition, a neutralization reaction of the ethylene/unsaturated carboxylic acid ester copolymer and/or the ethylene/unsaturated carboxylic acid copolymer with metal ions is carried out. As the neutralization reaction, a case where the ester group portion of the ethylene/unsaturated carboxylic acid ester copolymer decomposes into a carboxylic acid to become a metal-containing carboxylate and a case where the ester group portion is directly converted into a metal-containing carboxylate can be thought.

In the intermediate reaction, heating is carried out in the presence of a compound including metal ions which form an ionomer. By heating in the presence of a compound including metal ions, the number of steps can be reduced and the reaction can be further accelerated. For example, in a case where hydrolysis or thermal decomposition reaction is carried out in the absence of metal ions, the reaction is completed within 100 minutes at 240° C., within 30 minutes at 260° C., and within about 10 minutes at 280° C., but in a case where a compound including metal ions coexists and a reaction is carried out under the same conditions, the decomposition reaction is completed within about 20 minutes even at 200° C.

The temperature at which the ethylene/unsaturated carboxylic acid ester copolymer is heated may be a temperature at which the ester becomes carboxylic acid, and in a case where the heating temperature is too low, ester is not converted into carboxylic acid, and in a case where the heating temperature is too high, decarbonylation or decomposition of the copolymer progresses. Accordingly, the heating temperature of the present invention is preferably in the range of 100° C. to 350° C., more preferably 150° C. to 340° C., and still more preferably 200° C. to 330° C.

The reaction time varies depending on the heating temperature, the reactivity of the ester group portion, or the like, and is typically 1 minute to 50 hours, more preferably 2 minutes to 30 hours, still more preferably 2 minutes to 10 hours, still more preferably 2 minutes to 3 hours, and particularly preferably 3 minutes to 2 hours.

In the above step, there is no particular limitation to the reaction atmosphere, but the reaction is generally preferably carried out under an inert gas stream. As examples of the inert gas, a nitrogen atmosphere, an argon atmosphere, a carbon dioxide atmosphere can be used, and a small amount of oxygen or air may be mixed in.

The reactor used in the above step is not particularly limited, and there is no limitation as long as it is a method capable of substantially uniformly stirring a copolymer. A glass container or an autoclave (AC) provided with a stirrer may be used, and an kneading machine known in the related art such as Brabender Plastograph, a single or twin screw extruder, a strong screw type kneader, a Banbury mixer, a kneader, a roll, or the like can also be used.

EXAMPLES

Hereinafter, the present invention will be described in more detail with reference to examples and comparative examples, but the invention is not intended to be limited to these examples.

Measurement and evaluation of physical properties in the examples and the comparative examples were carried out by the following methods.

<Measurement and Evaluation>
(1) Measurement of Phase Angle δ (G*=0.1 MPa) at Absolute Value G*=0.1 MPa of Complex Elastic Modulus
1) Pretreatment of Sample In a case where an acid group is included in a sample, for example, an esterification treatment such as methyl esterification using diazomethane, tetramethylsilane (TMS) diazomethane or the like was carried out and the resulting product was used for measurement.

2) Preparation and Measurement of Sample

After the sample was placed in a mold for heating press having a thickness of 1.0 mm and preheated for 5 minutes in a hot press machine having a surface temperature of 180° C., by repeating pressurization and depressurization, residual gas in the molten resin was degassed, the, pressurization was further carried out at 4.9 MPa, and this state was maintained for 5 minutes. Thereafter, the sample was transferred to a press machine having a surface temperature of 25° C., and cooled by maintaining at a pressure of 4.9 MPa for 3 minutes, whereby a press plate formed of a sample having a thickness of about 1.0 mm was manufactured. The press plate formed of a sample was processed into a circular shape having a diameter of 25 mm to obtain a sample, and using an ARES type rotary rheometer manufactured by Rheometrics Inc, as a measuring apparatus for dynamic viscoelastic properties, dynamic viscoelasticity was measured in a nitrogen atmosphere under the following conditions.

Plate: ϕ25 mm (diameter) parallel plate
Temperature: 160° C.
Distortion amount: 10%
Measurement angular frequency range: $1.0 \times 10^{-2}$ to $1.0 \times 10^{2}$ rad/s
Measurement interval: 5 points/decade The phase angle δ was plotted against the common logarithm log G* of the absolute value G* (Pa) of the complex elastic modulus, and the value of δ (degree) at the point corresponding to log G*=5.0 was set as δ (G*=0.1 MPa). In a case where there is no point corresponding to log G*=5.0 in the measurement points, using two points around log G*=5.0, the δ value at log G*=5.0 was determined by linear interpolation. In addition, in a case where at every measurement points, log G* was less than 5, using the values of 3 points from the larger log G* value, the δ value at log G*=5.0 in the quadratic curve was determined by extrapolation.

(2) Measurement of Weight Average Molecular Weight (Mw) and Molecular Weight Distribution Parameter (Mw/Mn)

The weight average molecular weight (Mw) was determined by gel permeation chromatography (GPC). In addition, the number average molecular weight (Mn) was further determined by gel permeation chromatography (GPC), and the molecular weight distribution parameter (Mw/Mn) was calculated from the ratio of Mw to Mn, that is, Mw/Mn.

Measurement was carried out according to the following procedures and conditions.

1) Pretreatment of Sample

In a case where an acid group is included in a sample, for example, an esterification treatment such as methyl esterification using diazomethane, tetramethylsilane (TMS) diazomethane or the like was carried out and the resulting product was used for measurement.

2) Production of Sample Solution 3 mg of the sample and 3 mL of o-dichlorobenzene were put into a 4 mL vial bottle and weighed, then, the vial bottle was capped with a screw cap and a Teflon (registered trademark) Septa, and using SSC-7300 type high temperature shaker manufactured by Senshu Scientific co., ltd., shaking was carried out at 150° C. for 2 hours. After shaking ended, it was visually confirmed that there was no insoluble component.

3) Measurement

One high-temperature GPC column Showdex HT-G and two HT-806M manufactured by SHOWA DENKO K.K. were connected to Alliance GPCV 2000 type manufactured by Waters, and using o-dichlorobenzene as an eluent, measurement was carried out at a temperature of 145° C., and at a flow rate of 1.0 mL/min.

4) Calibration Curve

For calibration of the column, measurement of monodispersed polystyrene manufactured by SHOWA DENKO K.K. (each 0.07 mg/ml solution of S-7300, S-3900, S-1950, S-1460, S-1010, S-565, S-152, S-66.0, S-28.5, and S-5.05), n-eicosane, and n-tetracontane was carried out under the same conditions as above, and the logarithmic value of the elution time and the molecular weight was approximated to a quartic equation. For the conversion of the molecular weights of polystyrene and polyethylene, the following formula was used.

$$M_{PE}=0.468 \times M_{PS}$$

(3) Melt Flow Rate (MFR)

The MFR was measured under the conditions of a temperature of 190° C., and a load of 21.18 N in according to Table 1-Condition 7 of JIS K-7210 (1999).

(4) Tensile Test

A sheet having a thickness of 1 mm was produced from the ethylene-based ionomer of each example by the method (cooling method A) described in JIS K7151 (1995), and using a 5B type small specimen described in JIS K7162 (1994) produced by punching out this, a tensile test was carried out under the condition of a temperature of 23° C. according to JIS K7161 (1994), and tensile modulus, tensile stress at break, and tensile fracture strain were measured. The test speed was 10 mm/min.

(5) Melting Point

The melting point is indicated by the peak temperature of endothermic curve measured by a differential scanning calorimeter (DSC). DSC (DSC 7020) manufactured by SII NanoTechnology Inc. was used for measurement, and the measurement was carried out under the following measurement conditions.

About 5.0 mg of the sample was packed in an aluminum pan, then, the temperature was raised to 200° C. at 10° C./min, maintained at 200° C. for 5 minutes, and lowered to 30° C. at 10° C./min. The maximum peak temperature among the endothermic curves when the temperature was raised again at 10° C./min after being maintained at 30° C. for 5 minutes was taken as the melting point.

(6) Tensile Impact Strength

1) Production Method of Tensile Impact Strength Test Sample

After the resin pellets of each example and each comparative examples were placed in a mold for heating press having a thickness of 1 mm and preheated for 5 minutes in a hot press machine having a surface temperature of 180° C., by repeating pressurization and depressurization, the resin was melted and residual gas in the molten resin was degassed, the, pressurization was further carried out at 4.9 MPa, and this state was maintained for 5 minutes. Thereafter, in a state in which a pressure of 4.9 MPa was applied, the temperature was slowly cooled at a rate of 10° C./min, and when the temperature was lowered to around room temperature, the molding plate was taken out from the mold. The obtained molding plate was conditioned for 48 hours or longer in an environment of a temperature of 23±2° C., and a humidity of 50±5° C. A test piece in the shape of ASTM D 1822 Type-S was punched out from the press plate after conditioning, and this was used as a tensile impact strength test sample.

2) Tensile Impact Strength Test Conditions

Tensile impact strength was measured using the test piece with reference to the method B of JIS K 7160-1996. The only difference from JIS K 7160-1996 was the shape of the test piece. For other measurement conditions, the test was carried out by the method according to JIS K 7160-1996.

(7) Amount of Aluminum (Al)

The amount of aluminum (Al) included in the polar group-containing olefin copolymer can be determined by a method of calculating as a value obtained by dividing the amount of aluminum (Al) contained in the alkylaluminum subjected to polymerization by the yield of the obtained polar group-containing olefin copolymer and a method of measuring by fluorescent X-ray analysis.

1) Method of Calculating from Alkylaluminum Polymerization Addition Amount

Specifically, it was calculated by the following equation.

$$\mu g_{Al} = n \times Mw\ (Al) \times 10^3\ (\mu g)$$

n: addition amount (mmol) of alkylaluminum subjected to polymerization

Mw (Al): molecular weight (26.9 g/mol) of aluminum (Al)

Here, the unit of aluminum (Al) content is "$\mu g_{Al}/g$", and means that the amount of aluminum (Al) included in 1 g of the polar group-containing olefin copolymer is expressed in a μg unit.

2) Method of Measuring by Fluorescent X-Ray Analysis

The amount of aluminum (Al) included in the polar group-containing olefin copolymer was determined by fluorescent X-ray analysis. Details are as described above.

(8) Measurement of Structural Unit Amount of Polar Group-Containing Monomer

1) Structural Unit of Polar Group-Containing Olefin Copolymer

The structural unit and the structural unit amount of the polar group-containing olefin copolymer according to the present invention will be described.

A structure derived from each one molecule of ethylene and/or an α-olefin having 3 to 20 carbon atoms and a polar group-containing monomer is defined as one structural unit in the polar group-containing olefin copolymer. The ratio of each structural unit in the polar group-containing olefin copolymer in terms of mol % is the structural unit amount.

2) Measurement Method of Structural Unit Amount of Polar Group-Containing Monomer The structural unit amount of the polar group in the polar group-containing olefin copolymer according to the present invention can be determined by using $^1$H-NMR spectrum. $^1$H-NMR spectrum was measured by the following method.

200 to 250 mg of the sample was put into an NMR sample tube having an inner diameter of 10 mmφ together with 2.4 ml of o-dichlorobenzene/deuterated benzene bromide ($C_6D_5Br$)=4/1 (volume ratio) and hexamethyldisiloxane which is a standard substance for chemical shift, and after being purged with nitrogen, the tube was sealed, and the resulting product was dissolved by heating and subjected to NMR measurement as a homogeneous solution. NMR measurement was carried out at 120° C. using an AV 400 M type NMR apparatus provided with a cryoprobe of 10 mmφ manufactured by Bruker.

$^1$H-NMR was measured at a pulse angle of 1°, a pulse interval of 1.8 seconds, and an accumulation count of 1,024 or greater. The chemical shift was set by setting the peak of the methyl proton of hexamethyldisiloxane to 0.088 ppm, and chemical shifts of peaks due to other protons were based on this.

$^{13}$C-NMR was measured at a pulse angle of 90°, a pulse interval of 20 seconds, and an accumulation count of 512 or greater by a proton complete decoupling method. The chemical shift was set by setting the peak of the methyl carbon of hexamethyldisiloxane to 1.98 ppm, and chemical shifts of peaks due to other carbons were based on this.

The polar group structural unit amount [Z] (mol %) in Table 3 corresponds to the total amount (mol %) of units derived from at least one selected from the group consisting of unsaturated carboxylic acid and unsaturated carboxylic acid ester.

<Production Example of Base Polymer>

Production Example 1: Ethylene/t-Butyl Acrylate Copolymer (EtBA)

Synthesis of Metal Complexes

As the metal complex, a ligand B-27DM represented by the following chemical formula was used according to Synthesis Example 4 described in Pamphlet of International Publication No. 2010/050256. According to Example 1 of Pamphlet of International Publication No. 2010/050256, using bis-1,5-cyclooctadiene nickel (0) (referred to as Ni(COD)$_2$), a nickel complex in which B-27DM and Ni(COD)$_2$ had been reacted in a 1:1 ratio was synthesized.

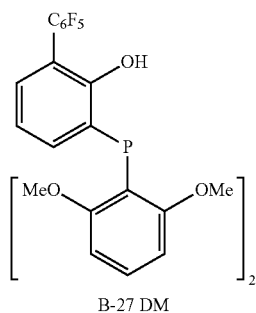

B-27 DM

Copolymerization of Ethylene and t-Butyl Acrylate (tBA)

Dry toluene (1.0 liter), 36.6 mg (0.1 mmol) of tri n-octylaluminum (TNOA), and 14.6 ml (100 mmol) of acrylic acid t-butyl ester were put into an autoclave provided with a stirring blade having an internal volume of 2.4 liters. While stirring, the autoclave was heated to 90° C., nitrogen was supplied thereto up to 0.3 MPa, ethylene was supplied to the autoclave, and the autoclave was adjusted to have a pressure of 2.8 MPa. After the adjustment ended, copolymerization was initiated by injecting 80 μmol of a transition metal catalyst (B-27DM-Ni complex) with nitrogen. After polymerization for 101 minutes, the reaction was stopped by cooling and depressurizing. After the reaction solution was poured into 1 liter of acetone to precipitate a polymer, the precipitate was filtration-washed and collected, and further dried to be a constant amount (47 g) under reduced pressure.

Production Example 2: Ethylene/t-Butyl Acrylate Copolymer (EtBA)

Synthesis of Metal Complexes

As the metal complex, a ligand represented by the following chemical formula (I) was used according to Synthesis Example 10 described in Pamphlet of International Publication No. 2010/058849. According to Example 1-1 of Pamphlet of International Publication No. 2010/058849, using palladium bisdibenzylidene acetone (referred to as Pd(dba)$_2$), a palladium in which I and Pd(dba)$_2$ had been reacted in a 1:1 ratio was synthesized.

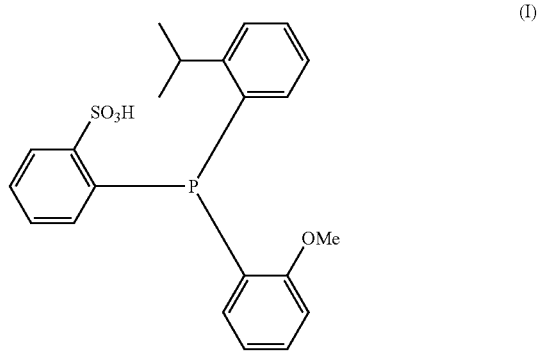 [SMILES: COc1ccccc1P(c1ccccc1C(C)C)c1ccccc1S(=O)(=O)O]

Copolymerization of Ethylene and t-Butyl Acrylate (tBA)

After an autoclave provided with a stirring blade having an internal volume of 2.4 liters was purged with purified nitrogen, dry toluene (0.8 liters) and 233 ml (1.6 mol) of t-butyl ester (tBA) were put thereinto. While stirring, the autoclave was heated to 110° C., nitrogen was supplied thereto up to 0.3 MPa, and ethylene was supplied up to a pressure of 1.3 MPa until the ethylene partial pressure became 1 MPa. After the pressure adjustment ended, copolymerization was initiated by injecting 200 μmol of a transition metal catalyst (I—Pd complex) with nitrogen. During the reaction, the temperature was maintained at 110° C., and ethylene was continuously supplied such that the pressure was maintained, and after polymerization for 60 minutes, the reaction was stopped by cooling and depressurizing. After the reaction solution was poured into 1 liter of acetone to precipitate a polymer, the precipitate was filtration-washed and collected, and further dried to be a constant amount (46 g) at 60° C. under reduced pressure.

Production Example 3: Ethylene/t-Butyl Acrylate (EtBA)

Using a polymerization equipment having a vessel (stirring tank) type reactor having a volume of 5 liters, ethylene/t-butyl acrylate (EtBA) copolymer was produced by continuous polymerization operation.

Ethylene was introduced into the reactor at 1790 mol/hr, and then, 72 mmol/hr of tri n-octylaluminum (TNOA) and 55 mol/hr of acrylic acid t-butyl ester were sequentially introduced thereinto. Furthermore, by introducing a transition metal catalyst (B-27 DM-Ni complex) as an initiator at 3689 μmol/hr, copolymerization was initiated. By operating for 60 minutes under the conditions of a temperature inside the reactor of 130° C. and a pressure of 80 MPa, 1930 g of a copolymer was obtained. TNOA, t-butyl acrylate, and the transition metal catalyst used in the polymerization had been suitably diluted with dry toluene, and were used.

Production Examples 4 and 5: Ethylene/t-Butyl Acrylate (EtBA)

Among the methods described in Production Example 3, the amount of ligand, the amount of TNOA, the amount of ethylene, and the amount of polar group-containing monomer were each changed to the amounts described in Table 2 to polymerize, and as a result, polar group-containing olefin copolymers of Preparation Examples 4 and 5 were produced.

The polymerization conditions and the polymerization results of Production Examples 1 and 2 are shown in Table 1, the polymerization conditions and the polymerization results of Production Examples 3 to 5 are shown in Table 2, and the results of respective physical property measurements are shown in Table 3. "ND" in Table 3 means unmeasured.

In Table 1, the polymerization activity is expressed as the catalytic efficiency by using the copolymer yield (yield) (g) per 1 mol of the complex used in the polymerization. In Table 2, the polymerization activity is expressed as the catalytic efficiency by using the copolymer yield (yield) (g) per 1 mol of the complex used in the polymerization and per unit time. The polymerization activity (catalytic efficiency) was calculated assuming that the ligand and the metal form a complex by reacting in a 1:1 ratio.

Comparative Raw Material: Ethylene/Methacrylic Acid Copolymer (EMAA)

A polar group-containing olefin copolymer (manufactured by Mitsui Du Pont Chemical Co., Ltd., brand name: Nucrel N1108C) which is a copolymer of ethylene and methacrylic acid and produced by the high pressure radical process was used as a comparative raw material. The results of physical property measurement are described in Table 3.

Comparative Examples 1 to 4: Ethylene/Acrylic Acid Copolymer (EAA)

Ethylene/acrylic acid copolymer is a polar group-containing olefin copolymer which is a copolymer of ethylene and acrylic acid and produced by a Cr catalyst described in PTL 4. The physical properties are shown in Table 3.

TABLE 1

| | Ligand type | Amount of ligand μmol | TNOA mmol | Polar group-containing monomer type | Amount of polar group-containing monomer mmol | Polymerization conditions | | | Yield g | Catalytic efficiency g/mol |
|---|---|---|---|---|---|---|---|---|---|---|
| | | | | | | Ethylene partial pressure ml MPa | Temperature °C | Time Minutes | | |
| Production Example 1 | B27DM | 80 | 0.1 | tert butyl acrylate | 100 | 15 2.0 | 90 | 101 | 47 | 5.9E+05 |
| Production Example 2 | I | 200 | — | tert butyl acrylate | 1600 | 233 1.0 | 110 | 60 | 46 | 2.3E+05 |

TABLE 2

| | Ligand type | Amount of ligand μmol/hr | TNOA mmol/hr | Polar group-containing monomer type | Ethylene mol/hr | Polar group-containing monomer mol/hr | Polymerization conditions | | Time Minutes | Yield g | Catalytic efficiency g/(mol · hr) |
|---|---|---|---|---|---|---|---|---|---|---|---|
| | | | | | | | pressure MPa | Temperature °C | | | |
| Production Example 3 | B27DM | 3689 | 72 | tert butyl acrylate | 1790 | 55 | 80 | 130 | 60 | 1930 | 5.2E+05 |
| Production Example 4 | B27DM | 2949 | 48 | tert butyl acrylate | 1780 | 36 | 80 | 130 | 60 | 1610 | 5.5E+05 |
| Production Example 5 | B27DM | 1041 | 20 | tert butyl acrylate | 1790 | 17 | 80 | 130 | 60 | 2550 | 2.4E+06 |

TABLE 3

| | Polar group-containing monomer type | MFR g/10 min | Weight average molecular weight Mw * $10^{-4}$ | Molecular weight distribution parameter Mw/Mn | Melting point °C | Polar group structural unit amount [Z] mol % | $-3.74 \times$ [Z] + 130 | δ (G* = 0.1 MPa) ° | Amount of residual aluminum | |
|---|---|---|---|---|---|---|---|---|---|---|
| | | | | | | | | | Calculation from polymerization addition amount of aluminum compound $\mu g_{Al}/g$ | Measurement by fluorescent X-ray analysis $\mu g_{Al}/g$ |
| Production Example 1 | tert butyl acrylate | 19 | 5.4 | 2.30 | 105.0 | 3.4 | 117.3 | 64 | 57 | 62.0 |
| Production Example 2 | tert butyl acrylate | ND | 6.0 | 1.83 | 109.3 | 2.4 | 121.0 | ND | 0 | ND |
| Production Example 3 | tert butyl acrylate | 160 | 2.5 | 2.30 | 105.0 | 3.2 | 117.9 | 69.6 | 1007 | ND |
| Production Example 4 | tert butyl acrylate | 104 | 2.9 | 2.50 | 113.2 | 2.2 | 121.8 | 70 | 805 | ND |

TABLE 3-continued

| | Polar group-containing monomer type | MFR g/10 min | Weight average molecular weight Mw * $10^{-4}$ | Molecular weight distribution parameter Mw/Mn | Melting point °C. | Polar group structural unit amount [Z] mol % | $-3.74 \times$ [Z] + 130 | δ ($G^* = 0.1$ MPa) ° | Amount of residual aluminum Calculation from polymerization addition amount of aluminum compound $\mu g_{Al}/g$ | Amount of residual aluminum Measurement by fluorescent X-ray analysis $\mu g_{Al}/g$ |
|---|---|---|---|---|---|---|---|---|---|---|
| Production Example 5 | tert butyl acrylate | 60 | 3.8 | 2.40 | 120.2 | 1.1 | 126.1 | 72.7 | 212 | ND |
| Comparative raw material | methacrylic acid | 8 | 8.1 | 6.70 | 98.0 | 3.9 | 115.6 | 42.0 | 0 | ND |
| Comparative Example 1 | acrylic acid | 124 | ND | ND | 129.0 | 3.0 | 118.8 | ND | 146000 | ND |
| Comparative Example 2 | acrylic acid | 3.9 | ND | ND | 125.0 | 4.7 | 112.4 | ND | ND | ND |
| Comparative Example 3 | acrylic acid | 1.5 | ND | ND | 131.0 | 1.7 | 123.6 | ND | 347000 | ND |
| Comparative Example 4 | acrylic acid | 1.7 | ND | ND | 128.0 | 2.4 | 121.0 | ND | ND | ND |

Examples 1 to 5: Production of EtBA-Based Ionomer 40 g of the resin of Production Example 1 and 0.4 g of IRGANOX B225 as an antioxidant were put into Labo Plastomill: Roller Mixer Model R60 manufactured by Toyo Seiki Seisaku-sho, Ltd. provided with a small mixer having a volume of 60 ml, and the resulting product was kneaded at 160° C., and 40 rpm for 3 minutes. Thereafter, the rotational speed was lowered to 20 rpm, then, a sodium carbonate aqueous solution was added dropwise while changing the amount such that the desired degree of neutralization was obtained, and then, the resulting product was kneaded at 270° C., and 40 rpm for 15 minutes.

In the IR spectrum of the obtained resin, the peak around 1730 cm$^{-1}$ disappeared, and the peaks around 1700 cm$^{-1}$ and 1560 cm$^{-1}$ were increased. Thus, it was confirmed that the thermal decomposition of the ester and the desired neutralization could be achieved, and an ionomer could be produced.

Reference Example

As a reference example, a copolymer produced in the same manner as described above except that it was not neutralized was used. Specifically, kneading was carried out in the same manner as in Examples 1 to 5 except that the sodium carbonate aqueous solution was not added dropwise. In the IR spectrum of the obtained resin, the peak of the ester group around 1730 cm$^{-1}$ disappeared, and the peak of the carboxyl group around 1700 cm$^{-1}$ was increased. Thus, it was confirmed that the thermal decomposition of the ester could be achieved.

Example 6: Production of EtBA-Based Ionomer

An ionomer having a degree of neutralization of 100% was produced in the same manner as in Example 5 except that the resin of Production Example 2 was used.

Examples 7 to 9: Production of EtBA-Based Ionomer 40 g of the resin of Production Example 3, 0.8 g of paratoluenesulfonic acid monohydrate, and 0.4 g of IRGANOX B225 as an antioxidant were put into Labo Plastomill: Roller Mixer Model R60 manufactured by Toyo Seiki Seisaku-sho, Ltd. provided with a small mixer having a volume of 60 ml, and the resulting product was kneaded at 160° C., and 40 rpm for 3 minutes. Thereafter, the rotational speed was lowered to 20 rpm, then, a sodium carbonate aqueous solution was added dropwise so as to be the desired degree of neutralization, and then, the resulting product was kneaded at 250° C., and 40 rpm for 5 minutes.

In the IR spectrum of the obtained resin, the peak around 1730 cm$^{-1}$ disappeared, and the peaks around 1700 cm$^{-1}$ and 1560 cm$^{-1}$ were increased. Thus, it was confirmed that the decomposition of the ester and the desired neutralization could be achieved, and an ionomer could be produced.

Examples 10 and 11: Production of EtBA-Based Ionomer

Ionomers having a degree of neutralization of 100% were produced in the same manner as in Example 9 except that the resins of Production Examples 4 and 5 were used.

Comparative Examples 5 to 9: Production of Nucrel-Based Ionomer 40 g of the comparative raw material resin and 0.4 g of IRGANOX B225 as an antioxidant were put into Labo Plastomill: Roller Mixer Model R60 manufactured by Toyo Seiki Seisaku-sho, Ltd. provided with a small mixer having a volume of 60 ml, and the resulting product was kneaded at 180° C., and 40 rpm for 3 minutes. Thereafter, the rotational speed was lowered to 20 rpm, then, a sodium carbonate aqueous solution was added dropwise while changing the amount such that the desired degree of neutralization was obtained, and then, the resulting product was kneaded at 200° C., and 40 rpm for 5 minutes.

In the IR spectrum of the obtained resin, the peak around 1700 cm$^{-1}$ disappeared, and the peak around 1560 cm$^{-1}$ was increased. Thus, it was confirmed that the desired neutralization could be achieved, and an ionomer could be produced.

Comparative Examples 10: HIMILAN

HIMILAN is an ionomer based on a polar group-containing olefin copolymer (manufactured by Mitsui Du Pont Chemical Co., Ltd., brand name: HIMILAN 1555) which is a copolymer of ethylene and methacrylic acid and produced by the high pressure radical process was used as a comparative raw material.

The ionomers obtained in Examples 1 to 5 and Comparative Examples 5 to 9 and the results of the physical property evaluation of the reference examples and the comparative raw materials are shown in Table 4.

The ionomers obtained in Examples 6 to 11 and the results of the physical property evaluation of Comparative Example 10 are shown in Table 5. "ND" in Table 5 means unmeasured.

Comparative Examples 5 to 9 based on the polar group-containing olefin copolymer produced by using a high pressure radical method in the related art.

In addition, from the fact that, in the same manner, Examples 6 to 11 which are ethylene-based ionomers based on the polar group-containing olefin copolymer produced in the presence of a transition metal catalyst exhibit higher tensile modulus, tensile impact strength, and a higher melting point compared with Comparative Example 10 which is an ethylene-based ionomer based on the polar group-containing olefin copolymer produced by using a high pressure radical method in the related art, it was shown that the ionomer based on the polar group-containing olefin copolymer produced in the presence of a transition metal catalyst is excellent in not only mechanical properties but also various physical properties such as balance between rigidity

TABLE 4

| | Raw material resin | Degree of neutralization % | MFR g/10 min | Tensile modulus MPa | Tensile stress at break MPa | Tensile fracture strain % |
|---|---|---|---|---|---|---|
| Example 1 | Production Example 1 | 10 | 1.5 | 124 | 40.1 | 1142 |
| Example 2 | | 20 | 0.4 | 145 | 42.9 | 1031 |
| Example 3 | | 30 | 0.13 | 165 | 47.4 | 880 |
| Example 4 | | 50 | 0.02 | 157 | 54.0 | 717 |
| Example 5 | | 100 | No Flow | 135 | 56.5 | 489 |
| Reference Example | | 0 | 6 | 112 | 36.5 | 1179 |
| Comparative Example 5 | Comparative raw material | 10 | 5 | 109 | 27.2 | 721 |
| Comparative Example 6 | | 20 | 3.2 | 128 | 27.4 | 677 |
| Comparative Example 7 | | 30 | 1.9 | 158 | 27.8 | 619 |
| Comparative Example 8 | | 50 | 0.5 | 149 | 33.2 | 625 |
| Comparative Example 9 | | 100 | 0.06 | 125 | 32.6 | 444 |
| Comparative raw material | | 0 | 8 | 102 | 26.9 | 742 |

TABLE 5

| | Raw material resin | Degree of neutralization % | MFR g/10 min | Tensile modulus MPa | Tensile impact strength kJ/m$^2$ | Melting point ° C. |
|---|---|---|---|---|---|---|
| Example 6 | Production Example 2 | 100 | ND | 226 | 475 | 109 |
| Example 7 | Production Example 3 | 60 | 0.7 | 356 | 420 | 108 |
| Example 8 | | 80 | 0.36 | 298 | 565 | 107 |
| Example 9 | | 100 | 0.09 | 197 | 913 | 105 |
| Example 10 | Production Example 4 | 100 | 0.17 | 275 | 599 | 111 |
| Example 11 | Production Example 5 | 100 | 0.25 | 299 | 409 | 119 |
| Comparative Example 10 | | 74 | 10 | 158 | 397 | 95 |

[Discussion of Results of Examples and Comparative Examples]

Examples 1 to 5 are ethylene-based ionomers based on the polar group-containing olefin copolymer produced in the presence of a transition metal catalyst and exhibit higher mechanical properties (tensile modulus, tensile stress at break, and tensile fracture strain) at any degree of neutralization, compared with the ethylene-based ionomers of and toughness or heat resistance compared with ionomers produced by the method in the related art.

The reason why the ethylene-based ionomer based on the polar group-containing olefin copolymer produced in the presence of a transition metal catalyst is excellent in various physical properties such as mechanical properties and heat resistance compared with the ethylene-based ionomers in the related art is not clear, but it is thought that, probably, it is necessary for the molecular structure of the polar group-containing olefin copolymer which becomes the base to be a linear structure. The polar group-containing olefin copolymer produced by using a high pressure radical method has a molecular structure with many branches, including too much short chain branching and long chain branching. It is known that the olefin-based resin having such a structure has inferior mechanical properties, impact resistance, and heat resistance, compared with an olefin-based resin having a straight chain structure, and it is inferred that there is this tendency also in the polar group-containing olefin copolymer. It is thought that the difference in the structure of the polar group-containing olefin copolymer which is the base affects the physical properties also in the ethylene-based ionomer, and as a result, it is thought that the ethylene-based ionomer based on the polar group-containing olefin copolymer having a straight chain structure has excellent physical properties.

In addition, in the same manner, it is thought that the physical properties of the polar group-containing olefin copolymer which becomes the base material greatly affect the physical properties of the ethylene-based ionomer. Since Production Examples 1 to 5 according to the present invention and the melting points are smaller than the value represented by $-3.74 \times [Z]+130$ ([Z]: polar group-containing comonomer content (mol %)), Production Examples 1 to 5 have high random copolymerizability and excellent mechanical properties such as impact strength. Furthermore, since the aluminum content included in 1 g of the polar group-containing olefin copolymer is less than 100,000 $\mu g_{Al}/g$, impurities are small, deterioration of mechanical properties and the influence of discoloration and deterioration are low.

For the reasons described above, it is thought that the polar group-containing olefin copolymer according to the present invention has excellent various physical properties such as mechanical properties, and the ethylene-based ionomer according to the present invention based on this is greatly influenced by the physical properties, and exhibits excellent physical properties including mechanical properties. In contrast, it is thought that Comparative Examples 1 to 4 are copolymers of ethylene and acrylic acid and are the polar group-containing olefin copolymers produced by a Cr catalyst described in PTL 4, but since the melting points are higher than the value represented by $-3.74 \times [Z]+130$ ([Z]: polar group-containing comonomer content (mol %)) and the aluminum content included in 1 g of the polar group-containing olefin copolymer is greater than 100,000 $\mu g_{Al}/g$, various physical properties are very poor. It is easily inferred that the ethylene-based ionomer based on the polar group-containing olefin copolymer having such poor physical properties inevitably has inferior physical properties.

From the good results of the respective examples and the comparison with the respective comparative examples, it is found that the ethylene-based ionomer according to the present invention has remarkably superior mechanical properties, a balance between rigidity and toughness, and heat resistance compared with the products in the related art, and its significance, reasonableness, and excellence to the related art are clear.

The present invention has been described in detail and with reference to specific embodiments, and it is apparent to those skilled in the art that various modifications and changes are possible without departing from the spirit and the scope of the invention. This application is based on Japanese Patent Application (Japanese Patent Application No. 2014-210668) filed Oct. 15, 2014, and the contents thereof are incorporated herein by reference.

INDUSTRIAL APPLICABILITY

The ethylene-based ionomer according to the present invention exhibits excellent mechanical properties, a balance between rigidity and toughness, and heat resistance, and thus is useful.

The invention claimed is:

1. A production method of an ionomer, comprising:
    heating at a range from 100° C. to 350° C., an ethylene and/or α-olefin/unsaturated carboxylic acid ester copolymer and converting the ester group in the copolymer into a metal-containing carboxylate containing a metal ion of Group 1, 2, or 12 of the periodic table by reacting with a compound containing a metal ion of Group 1, 2, or 12 of the periodic table,
    producing the ethylene and/or α-olefin/unsaturated carboxylic acid ester copolymer by polymerizing ethylene, and/or α-olefins having 3 to 20 carbon atoms, and at least one or more unsaturated carboxylic acid esters, using a transition metal catalyst containing a transition metal of Groups 8 to 11 of the periodic table, and wherein the ethylene and/or α-olefin/unsaturated carboxylic acid ester copolymer has a melting point Tm of higher than 50° C. and 140° C. or lower,
    wherein the transition metal catalyst is a phosphine-phenolate complex catalyst.

2. The production method of an ionomer according to claim 1, wherein the transition metal is a transition metal of Group 10 of the periodic table.

3. A production method of an ionomer, comprising:
    heating at a range from 100° C. to 350° C., an ethylene and/or α-olefin/unsaturated carboxylic acid ester copolymer and converting the ester group in the copolymer into a metal-containing carboxylate containing a metal ion of Group 1, 2, or 12 of the periodic table by reacting with a compound containing a metal ion of Group 1, 2, or 12 of the periodic table,
    producing the ethylene and/or α-olefin/unsaturated carboxylic acid ester copolymer by polymerizing ethylene, and/or α-olefins having 3 to 20 carbon atoms, and at least one or more unsaturated carboxylic acid esters, using a transition metal catalyst containing a transition metal of Groups 8 to 11 of the periodic table, and wherein the ethylene and/or α-olefin/unsaturated carboxylic acid ester copolymer has a melting point Tm of higher than 50° C. and 140° C. or lower,
    wherein the α-olefin/unsaturated carboxylic acid ester copolymer has a Mw that is within a range of 20,000 to 1,000,000.

4. The production method of an ionomer according to claim 1, wherein the α-olefin/unsaturated carboxylic acid ester copolymer has a Mw that is within a range of 20,000 to 1,000,000.

5. The production method of an ionomer according to claim 1,
    wherein the heating further comprises: converting the ethylene/unsaturated carboxylic acid ester copolymer into an ethylene/unsaturated carboxylic acid copolymer by hydrolysis or thermal decomposition; and reacting the ethylene/unsaturated carboxylic acid copolymer with a compound containing a metal ion of Group 1, 2, or 12 of the periodic table to convert the carboxylic acid in the ethylene/unsaturated carboxylic acid copolymer into the metal-containing carboxylate.

6. The production method of an ionomer according to claim 1,
wherein the heating further comprises reacting with a compound containing a metal ion of Group 1, 2, or 12 of the periodic table while hydrolyzing or thermally decomposing the ester group of the ethylene/unsaturated carboxylic acid ester copolymer, to convert the ester group portion in the ethylene/unsaturated carboxylic acid ester copolymer into the metal-containing carboxylate.

7. The production method of an ionomer according to claim 1,
wherein the unsaturated carboxylic acid ester is a (meth) acrylic acid ester.

8. The production method of an ionomer according to claim 1,
wherein the metal ion is at least one or more selected from the group consisting of $Li^+$, $Na^+$, $K^+$, $Rb^+$, $Cs^+$, $Mg^{2+}$, $Ca^{2+}$, $Ba^{2+}$, and $Zn^{2+}$.

9. The production method of an ionomer according to claim 3,
wherein the transition metal catalyst is a phosphine-phenolate complex catalyst or a phosphine-sulfonate complex catalyst.

10. The production method of an ionomer according to claim 5, wherein the ethylene/unsaturated carboxylic acid copolymer and the ethylene/unsaturated carboxylic acid ester copolymer are copolymers obtained by random copolymerizing an ethylene unit with an unsaturated carboxylic acid and an unsaturated carboxylic acid ester unit, in a substantially linear shape.

11. The production method of an ionomer according to claim 5, wherein the ethylene/unsaturated carboxylic acid copolymer and the ethylene/unsaturated carboxylic acid ester copolymer have a phase angle δ of 45 degrees to 75 degrees at the absolute value $G^*=0.1$ MPa of a complex elastic modulus measured using a rotary rheometer.

12. The production method of an ionomer according to claim 5, wherein the ethylene/unsaturated carboxylic acid copolymer and the ethylene/unsaturated carboxylic acid ester copolymer have a ratio Mw/Mn of the weight average molecular weight (Mw) to the number average molecular weight (Mn) of 1.5 to 4.0.

\* \* \* \* \*

UNITED STATES PATENT AND TRADEMARK OFFICE
CERTIFICATE OF CORRECTION

PATENT NO. : 10,717,855 B2
APPLICATION NO. : 15/518314
DATED : July 21, 2020
INVENTOR(S) : T. Hattori et al.

Page 1 of 1

It is certified that error appears in the above-identified patent and that said Letters Patent is hereby corrected as shown below:

In the Claims

Column 45, Line 20 Claim 8, change "$Ca^{2+}$, $Ba^{2+}$, and $Zn^{2+}$" to -- $Ca^{2+}$, $Sr^{2+}$, $Ba^{2+}$, and $Zn^{2+}$ --

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*